(12) United States Patent
Hirose et al.

(10) Patent No.: US 8,778,825 B2
(45) Date of Patent: Jul. 15, 2014

(54) HONEYCOMB STRUCTURE AND HONEYCOMB CATALYST BODY

(75) Inventors: Shogo Hirose, Gifu (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/602,655

(22) Filed: Sep. 4, 2012

(65) Prior Publication Data
US 2013/0059724 A1    Mar. 7, 2013

(30) Foreign Application Priority Data

Sep. 6, 2011 (JP) ................................ 2011-193438

(51) Int. Cl.
*B01J 21/16* (2006.01)
(52) U.S. Cl.
USPC ................................................. 502/80
(58) Field of Classification Search
None
See application file for complete search history.

(56) References Cited

U.S. PATENT DOCUMENTS 4,869,944 A * 9/1989 Harada et al. ................. 428/116
6,159,893 A * 12/2000 Kondo ........................... 502/251
2008/0070776 A1 * 3/2008 Yamaguchi ................... 502/100
2008/0286184 A1 * 11/2008 Ando et al. ................. 423/213.5
2008/0317999 A1 12/2008 Patchett et al.

FOREIGN PATENT DOCUMENTS

| EP | 1 403 231 A1 | 3/2004 |
|----|--------------|--------|
| EP | 1 598 102 A1 | 11/2005 |
| JP | 2010-516466 A1 | 5/2010 |
| WO | 2008/094889 A1 | 8/2008 |

OTHER PUBLICATIONS

Extended European Search Report dated Feb. 27, 2013.

* cited by examiner

*Primary Examiner* — Melvin C Mayes
*Assistant Examiner* — Michael Forrest
(74) *Attorney, Agent, or Firm* — Burr & Brown, PLLC

(57) ABSTRACT

Partition walls are provided with small pores and large pores, a porosity of the partition walls is from 50 to 70%, a porosity of the large pores of the partition walls is 30% or larger, a ratio of a total volume of the small pores to a total volume of the large pores is 20% or larger, and in a graph showing a pore diameter distribution of the partition walls, the pore diameter at a maximum peak value of the large pores is from 20 to 200 μm, and the pore diameter at a maximum peak value of the small pores is from 0.1 to 8 μm. Furthermore, a value obtained by dividing a porosity value (%) of the large pores by a thickness value (μm) of the partition walls is 0.2 or larger in a honeycomb structure.

20 Claims, 12 Drawing Sheets

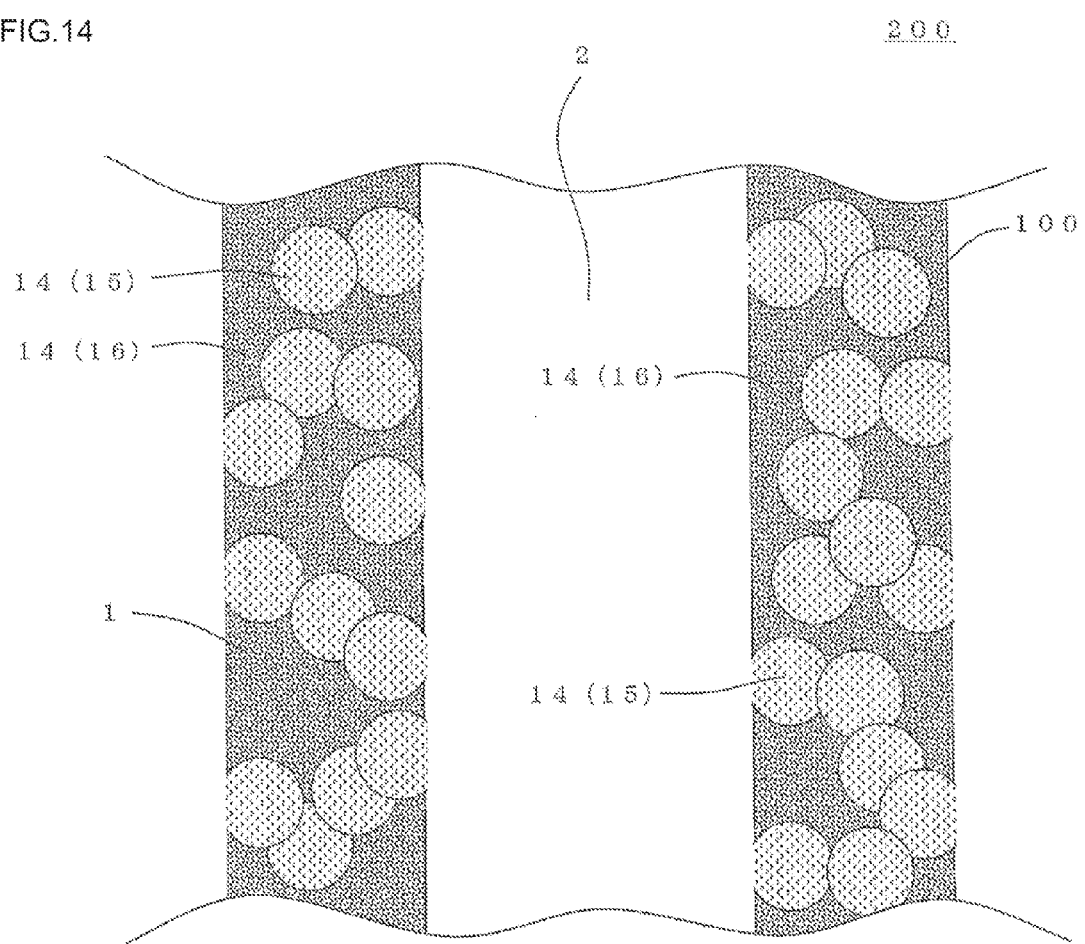

HONEYCOMB STRUCTURE AND HONEYCOMB CATALYST BODY

BACKGROUND OF THE INVENTION

1. Field of the Invention

The present invention relates to a honeycomb structure, and a honeycomb catalyst body. More particularly, it relates to the honeycomb structure which is suitably used as a catalyst carrier to purify an exhaust gas, and the honeycomb catalyst body in which a catalyst is loaded on such a honeycomb structure.

2. Description of Related Art

An exhaust gas discharged from an internal combustion engine such as a car engine includes nitrogen oxides ($NO_x$). From the viewpoints of influences on the global environment and the like, the purification of nitrogen oxides included in the exhaust gas is required. For example, a purifying method using an SCR catalyst is effective for the purification of the nitrogen oxides ($NO_x$). Therefore, the SCR catalyst is broadly used in the purification of the exhaust gas discharged from the engine or the like (specifically, the purification of the nitrogen oxides included in the exhaust gas). The term "SCR" is an abbreviation off("Selective Catalytic Reduction." The term "SCR catalyst" means the catalyst which selectively reduces components to be purified by a reductive reaction. In particular, examples of the SCR catalyst can include a catalyst which selectively reduces the nitrogen oxides.

When the SCR catalyst is used to purify the exhaust gas, the SCR catalyst is loaded on a catalyst carrier, and used as a catalyst body sometimes. Examples of the catalyst carrier can include a honeycomb structure including partition walls to divide and form cells which become through channels of a fluid. The loading of the catalyst on the partition walls of such a honeycomb structure is referred to as catalyst coating sometimes.

As a gas treatment device including such a honeycomb catalyst body, for example, a gas treatment device including a flow channel material and a composite catalyst is suggested (e.g., see Patent Document 1). The flow channel material includes an inlet axial end, an outlet axial end, wall elements each having such a length as to extend from the inlet axial end to the outlet axial end, and a plurality of passages defined by the wall elements, surrounded in an axial direction and having opened ends. That is, the flow channel material becomes the above honeycomb structure. The composite catalyst includes particles having an average particle diameter in excess of about three microns, and has a washcoat state where the catalyst is substantially deposited on the wall elements. In the gas treatment device of Patent Document 1, an average roughness of the surface of each wall element does not substantially change from the roughness before the catalyst is loaded on the walls.

[Patent Document 1] JP 2010-516466 T

In an SCR catalyst to perform the purification of nitrogen oxides and the like, an amount of the SCR catalyst has a very large influence on a purification performance. Therefore, to enhance the purification performance by the SCR catalyst, a large amount of the catalyst is required. For example, in a honeycomb catalyst body in which the SCR catalyst is loaded on partition walls of a honeycomb structure, a large amount of catalyst coating is required. However, when the large amount of catalyst coating is performed, there occurs the problem that a pressure loss of the honeycomb catalyst body increases.

Moreover, in the honeycomb catalyst body in which the catalyst is loaded on the partition walls of the honeycomb structure, due to the thickness of a layer of the catalyst coating, the cell open frontal area decreases, and the open area ratio of the honeycomb structure decreases. Furthermore, there has been the problem that the increase of the pressure loss is incurred.

Furthermore, in Patent Document 1, a method of filling pores of the partition walls with the catalyst is disclosed. However, the method disclosed in Patent Document 1 has the problem that the pores of the partition walls cannot be filled with a sufficient amount of the catalyst.

SUMMARY OF THE INVENTION

The present invention has been developed in view of the above problems, and a honeycomb structure is provided which is suitably used as a catalyst carrier to purify an exhaust gas, and a honeycomb catalyst body in which a catalyst is loaded on such a honeycomb structure. In particular, a honeycomb catalyst body is provided having a temperature immediately raised to a temperature at which the catalyst is activated, when heat is applied to the honeycomb catalyst body.

According to the present invention, the following honeycomb structure and honeycomb catalyst body are provided.

According to a first aspect of the present invention, a honeycomb structure is provided, comprising porous partition walls to divide and form a plurality of cells which extend from one end surface to the other end surface and define through channels of a fluid, wherein the partition walls are provided with small pores showing a distribution and having pore diameters which are smaller than 14 μm in a graph showing a pore diameter distribution of the partition walls, and large pores showing another distribution and having pore diameters of 14 μm or larger in the graph showing the pore diameter distribution of the partition walls, a porosity of the partition walls is from 50 to 70%, and a porosity of the large pores of the partition walls is 30% or larger, a ratio of a total volume of the small pores formed in the partition walls to a total volume of the large pores formed in the partition walls is 20% or larger, the pore diameter at a maximum peak value of pore volumes in the distribution of the large pores is from 20 to 200 μm in the graph showing the pore diameter distribution of the partition walls, and the pore diameter at a maximum peak value of pore volumes in the distribution of the small pores is from 0.1 to 8 μm in the graph showing the pore diameter distribution of the partition walls, and a value obtained by dividing a porosity value (%) of the large pores by a thickness value (um) of the partition walls is 0.2 or larger.

According to a second aspect, the honeycomb structure according to the above first aspect is provided, wherein the thicknesses of the partition walls are from 50.8 to 254 μm.

According to a third aspect, the honeycomb structure according to the above first or second aspects is provided, wherein a cell density of the honeycomb structure is 15.5 to 108.5 cells/$cm^2$.

According to a fourth aspect, the honeycomb structure according to any one of the above first to third aspects is provided, wherein a material of the partition walls contains at least one type selected from the group consisting of cordierite, aluminum titanate, silicon carbide, and mullite.

According to a fifth aspect. a honeycomb catalyst body comprising the honeycomb structure according to any one of the above first to fourth aspects is provided, and an SCR catalyst which selectively reduces components to be purified.

According to a sixth aspect, the honeycomb catalyst body according to the above fifth aspect is provided, wherein the SCR catalyst is a catalyst which selectively reduces nitrogen oxides.

Effect of the Invention

The honeycomb structure of the present invention includes porous partition walls to divide and form a plurality of cells which extend from one end surface to the other end surface and define through channels of a fluid. The partition walls are provided with small pores showing a distribution and having pore diameters which are smaller than 14 μm in a graph showing a pore diameter distribution of the partition walls, and large pores showing another distribution and having pore diameters of 14 μm or larger in the graph showing the pore diameter distribution of the partition walls. That is, in the partition walls, roughly divided two types of pores which have different sizes are formed. In the honeycomb structure of the present invention, the porosity of the partition walls is from 50 to 70%, and a porosity of the large pores of the partition walls is 30% or larger. Moreover, the ratio of a total volume of the small pores formed in the partition walls to a total volume of the large pores formed in the partition walls is 20% or larger. In addition, the pore diameter at a maximum peak value of pore volumes in the distribution of the large pores is from 20 to 200 μm in the graph showing the pore diameter distribution of the partition walls, and the pore diameter at a maximum peak value of pore volumes in the distribution of the small pores is from 0.1 to 8 μm in the graph showing the pore diameter distribution of the partition walls. Furthermore, a value obtained by dividing a porosity value (%) of the large pores by a thickness value (μm) of the partition walls is 0.2 or larger.

The honeycomb structure of the present invention is suitably be-used as a catalyst carrier to purify an exhaust gas. When the honeycomb structure includes the above constitution, the pores of the partition walls are filled with a large amount of catalyst.

For example, the catalyst is loaded on the honeycomb structure as the catalyst carrier by coating a slurry including a catalyst component. In the honeycomb structure of the present invention, when the catalyst slurry is introduced into the large pores, a water of the catalyst slurry is absorbed by the small pores. In consequence, the large pores of the partition walls are further filled with a solid component in the catalyst slurry, i.e., the catalyst component.

Moreover, when the pore diameter at the maximum peak value of each pore in the graph showing the pore diameter distribution of the partition walls is set to the above numeric range, the absorption of the water of the catalyst slurry can be promoted. That is, when the pore diameters of the small pores are made smaller, the water can easily be absorbed by a capillary phenomenon. Moreover, when the pore diameters of the large pores are made larger, the catalyst slurry including the solid component easily permeates the large pores. Furthermore, when the value obtained by dividing the porosity value (%) of the large pores by the thickness value (μ) of the partition walls is set to 0.2 or larger, the large pores are easily continuously formed. That is, when the large pores are continuously formed, open frontal areas are formed by part of the continuously formed large pores in the surfaces of the partition walls, whereby it is possible to promote the introduction of the catalyst slurry.

Furthermore, a honeycomb catalyst body of the present invention is a catalyst carrying body in which the catalyst is loaded on the above-mentioned honeycomb structure of the present invention. Since the honeycomb structure of the present invention is used as the catalyst carrier, the pores of the partition walls are filled with a larger amount of the catalyst. In consequence, according to the honeycomb catalyst body of the present invention, a suitable purification performance can be realized.

BRIEF DESCRIPTION OF THE DRAWINGS

FIG. 14 is a schematic view in which an area shown in C of FIG. 12 is enlarged.

DETAILED DESCRIPTION OF THE INVENTION

Figure 1:
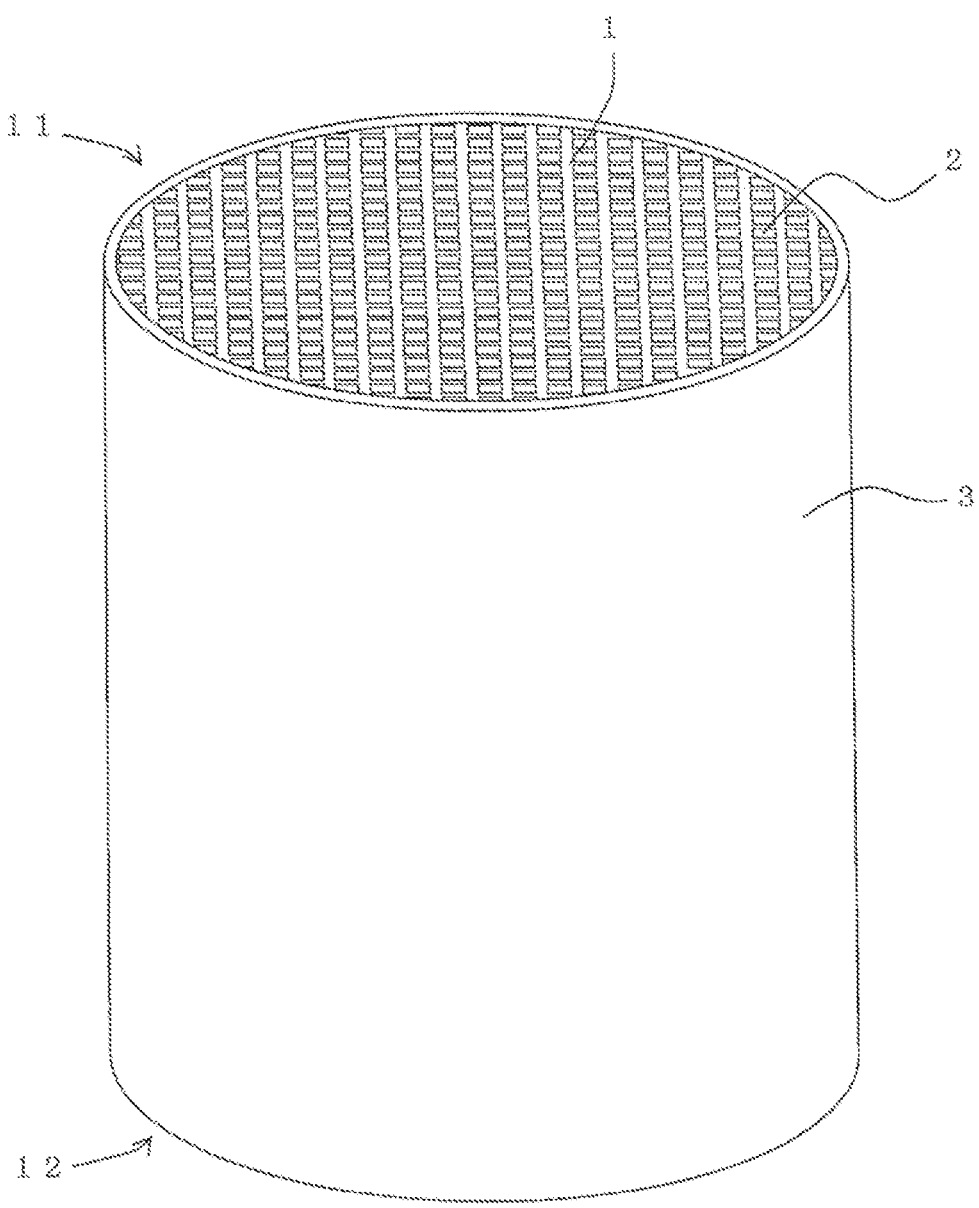
FIG. 1 is a perspective view schematically showing an embodiment of a honeycomb structure of the present invention.

Hereinafter, embodiments of the present invention will specifically be described with reference to the drawings. It should be understood that the present invention is not limited to the following embodiments and that modifications, improvements and the like are suitably added to the embodiments on the basis of the ordinary knowledge of a person skilled in the art without departing from the scope of the present invention.

(1) Honeycomb Structure:

First, an embodiment of a honeycomb structure of the present invention will be described. The honeycomb structure of the present embodiment is a honeycomb structure 100 shown in FIG. 1 to FIG. 5. The honeycomb structure 100 of the present embodiment includes porous partition walls 1 to divide and form a plurality of cells 2 which extend from one end surface 11 to the other end surface 12 and define through channels of a fluid. The partition walls 1 are provided with large pores 15 and small pores 16. The honeycomb structure 100 shown in FIG. 1 to FIG. 3 further includes an outer peripheral wall 3 positioned in the outermost periphery. The honeycomb structure 100 has a tubular shape including the partition walls 1 and the outer peripheral wall 3.

Figure 2:
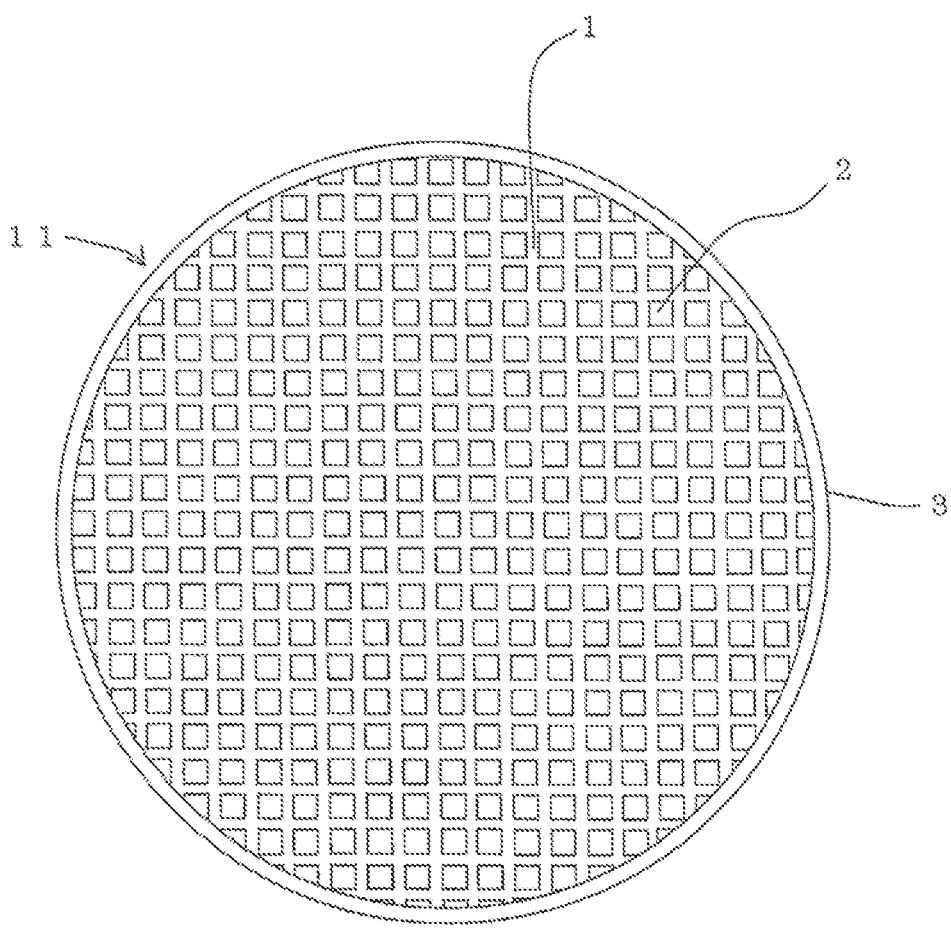
FIG. 2 is a plan view schematically showing one end surface side of the embodiment of the honeycomb structure of the present invention.
Figure 3:
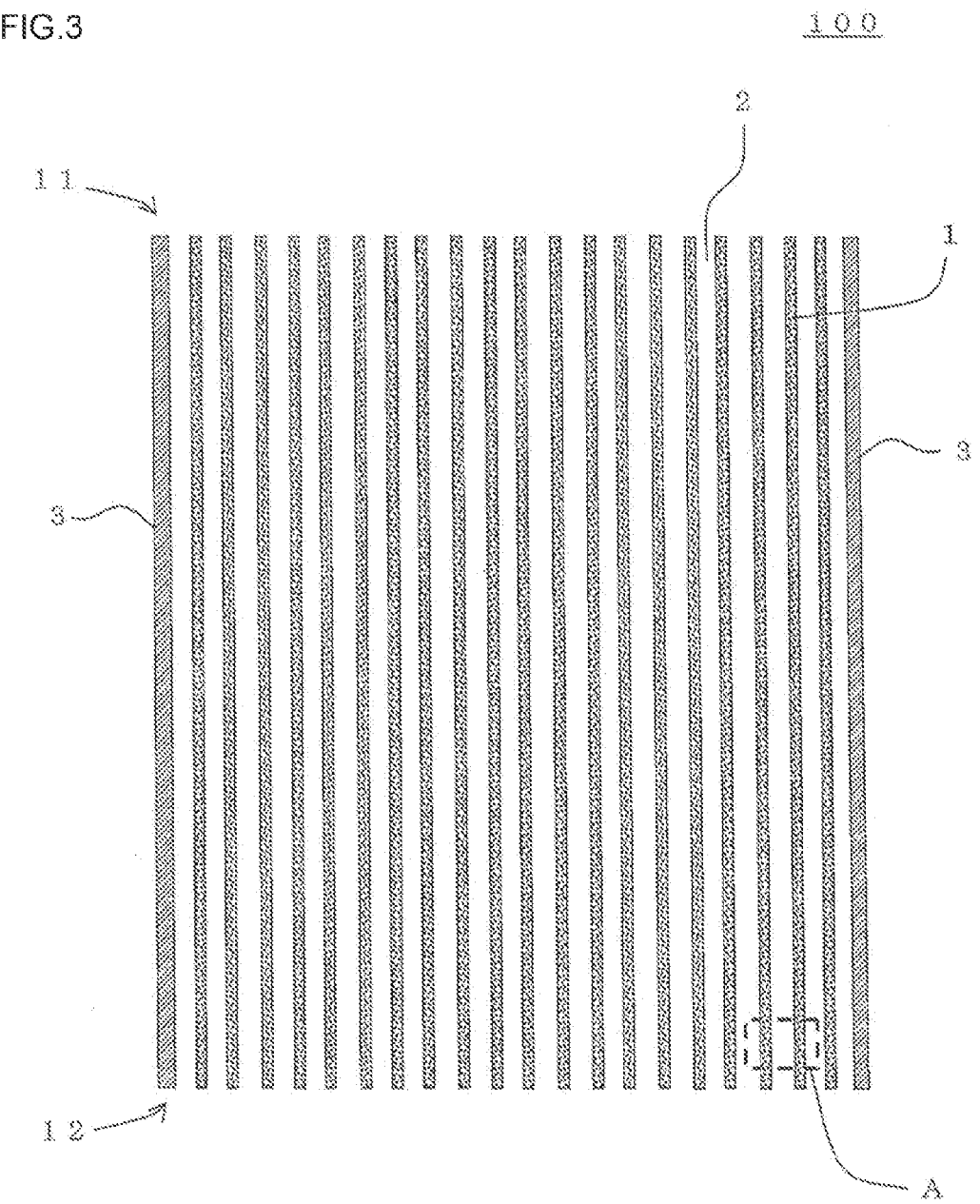
FIG. 3 is a sectional view schematically showing a cross section which is parallel to a cell extending direction in the embodiment of the honeycomb structure of the present invention.
Figure 4:
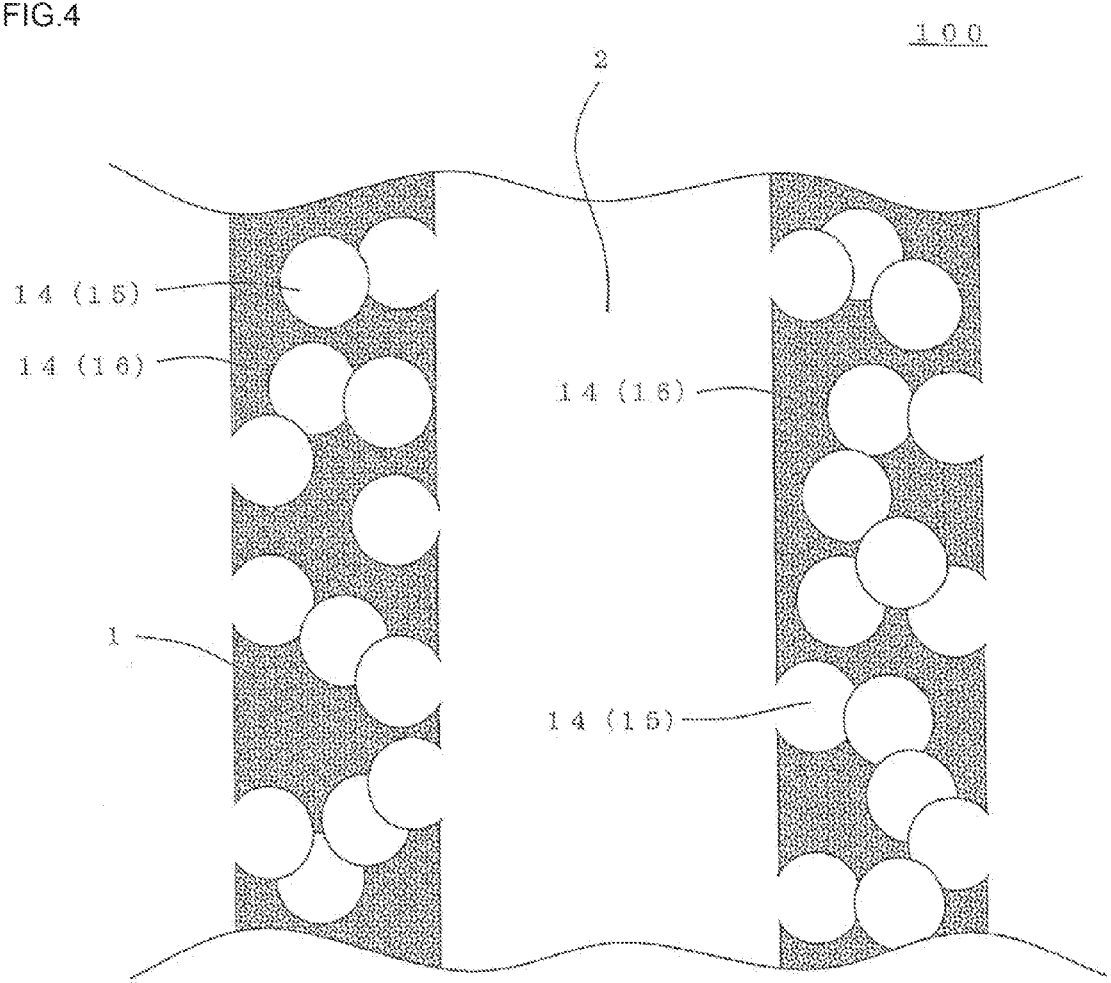
FIG. 4 is a schematic view in which an area shown in A of FIG. 3 is enlarged.
Figure 5:
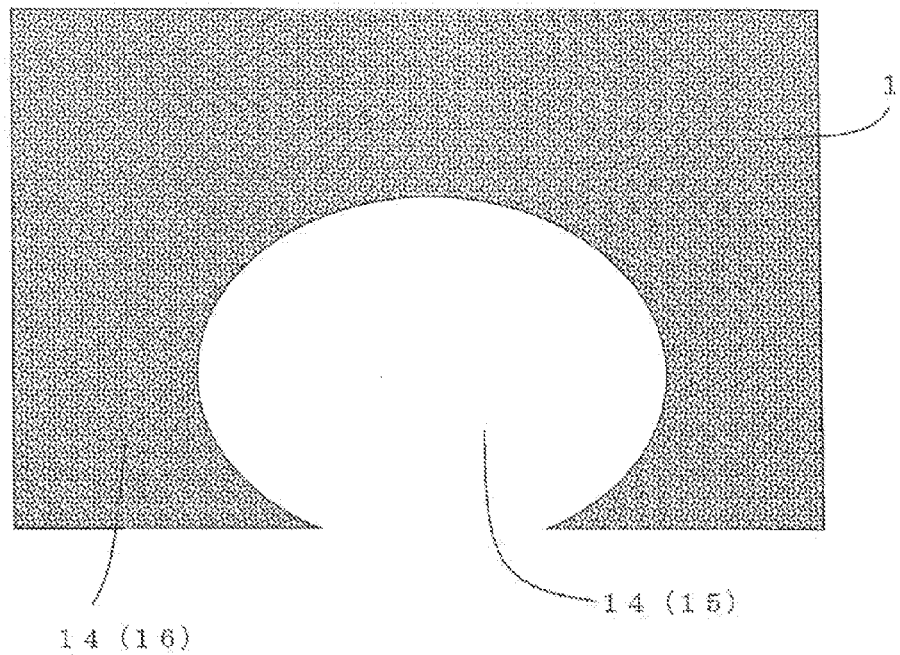
FIG. 5 is a schematic view in which part of FIG. 4 is further enlarged.

Here, FIG. 1 is a perspective view schematically showing the embodiment of the honeycomb structure of the present invention. FIG. 2 is a plan view schematically showing one end surface side of the embodiment of the honeycomb structure of the present invention. FIG. 3 is a sectional view schematically showing a cross section which is parallel to a cell extending direction in the embodiment of the honeycomb structure of the present invention. FIG. 4 is a schematic view in which an area shown in A of FIG. 3 is enlarged. FIG. 5 is a schematic view in which part of FIG. 4 is further enlarged.

The honeycomb structure 100 of the present embodiment can suitably be used as a catalyst carrier to purify an exhaust gas. In the honeycomb structure 100 of the present embodiment, the large pores 15 of the partition walls 1 are filled with a large amount of catalyst. Hereinafter, while describing the constitution of the honeycomb structure 100 of the present embodiment, a reason why the large pores 15 of the partition walls 1 can be filled with the large amount of the catalyst will be described.

The partition walls 1 of the honeycomb structure 100 of the present embodiment are provided with roughly divided two types of pores 14. That is, in the partition walls 1, there are formed "the small pores 16" having small pore diameters, and "the large pores 15" having pore diameters which are larger than those of the small pores 16. The small pores 16 are pores having the pore diameters which are smaller than 14 μm. The small pores 16 indicate one distribution in a graph showing a pore diameter distribution of the partition walls 1. The large pores 15 are pores having pore diameters of 14 μm or larger. The large pores 15 indicate a distribution other than the above one distribution in the graph showing the pore diameter distribution of the partition walls 1.

Figure 8:
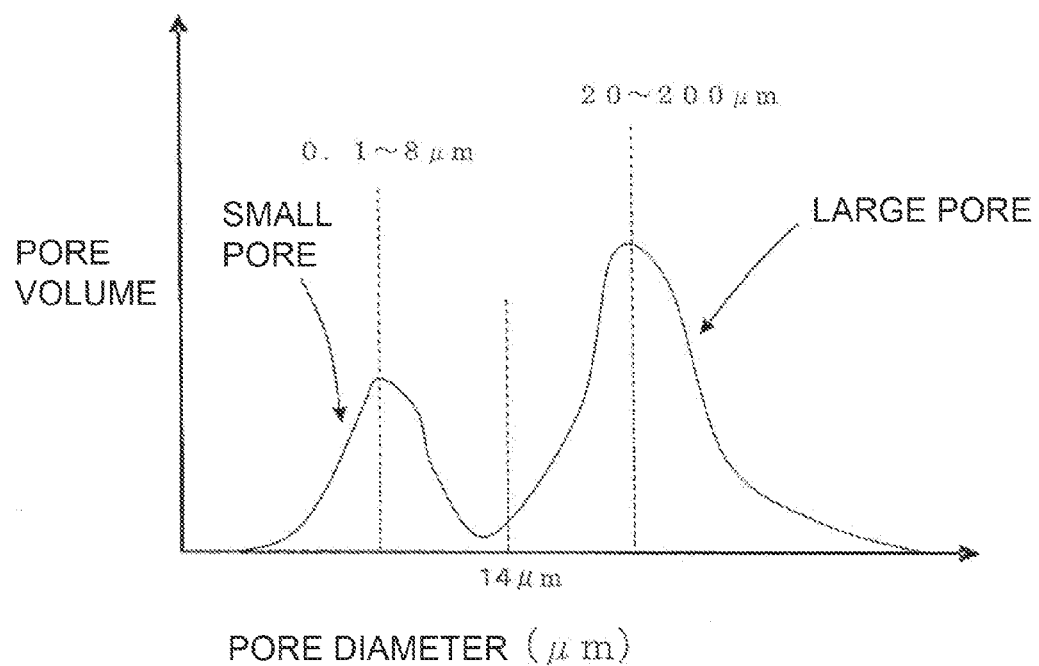
FIG. 8 is a graph showing an example of a pore diameter distribution of partition walls in the embodiment of the honeycomb structure of the present invention.

For example, in the honeycomb structure 100 of the present embodiment, when the pore diameter distribution of the partition walls 1 is shown in the graph, a graph showing a bimodal distribution is obtained as shown in FIG. 8. Here, FIG. 8 is a graph showing an example of the pore diameter distribution of the partition walls in the embodiment of the honeycomb structure of the present invention. The pore diameter distribution is also referred to as the micropore diameter distribution. The pore diameter distribution can be measured by a mercury intrusion porosimetry.

The pore diameter distribution in the present invention is the pore diameter distribution when the pore diameters of the partition walls which are measured by the mercury intrusion porosimetry are represented by a common logarithm. For example, the distribution can be shown in a graph in which the abscissa shows the pore diameters (the common logarithms: μm), and the ordinates shows a log differential pore volume (cc/g).

In the pore diameter distribution shown in FIG. 8, a distribution having a peak on a small pore diameter side. On the other hand, in the pore diameter distribution shown in FIG. 8, a distribution having a peak on a large pore diameter side is the distribution showing the large pores.

As shown in FIG. 5, in the honeycomb structure 100 of the present embodiment, the small pores 16 are formed in the whole area of each of the partition walls 1. Moreover, in the partition wall 1 in which the small pores 16 are formed, the large pore 15 having a larger pore diameter is further formed. That is, the honeycomb structure 100 of the present embodiment has a micropore structure where each of the large pores 15 is surrounded with the area provided with the small pores 16. In other words, this micropore structure can be considered to be a structure where in a base material of the partition walls provided with microscopic pores having remarkably small diameters (i.e., the small pores having the pore diameters which are smaller than 14 μm), the large pores having the pore diameters which are apparently larger than those of the microscopic pores.

Figure 6:
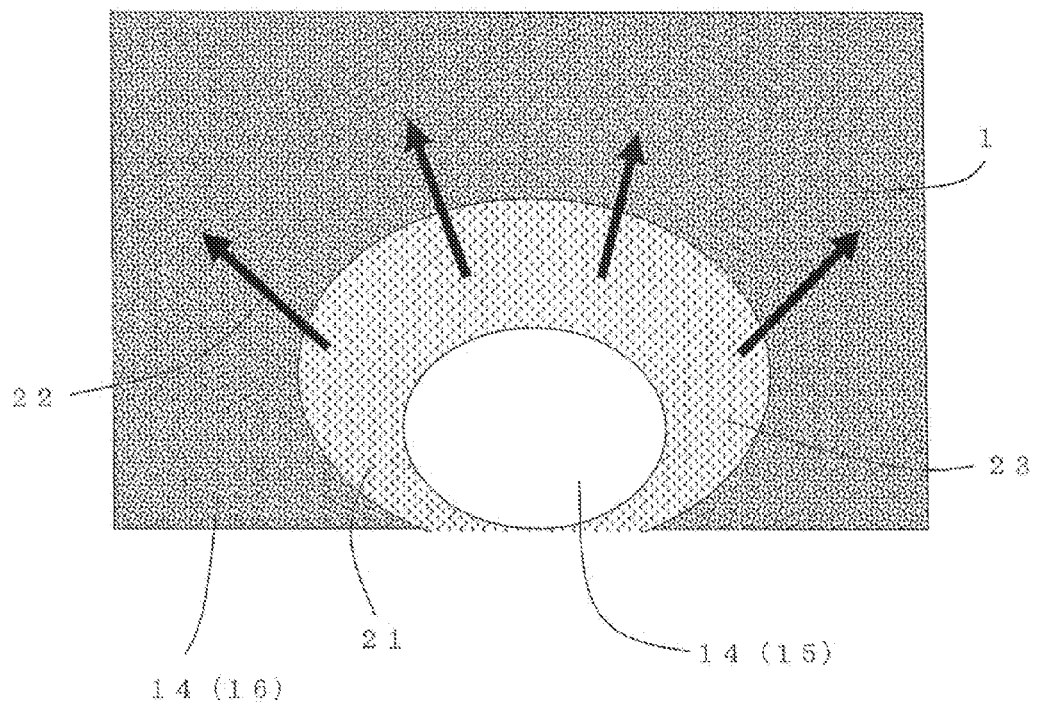
FIG. 6 is a schematic view showing that a pore of a partition wall shown in FIG. 5 is filled with a catalyst slurry.

For example, when the catalyst is loaded on the honeycomb structure as the catalyst carrier, the catalyst coating with a catalyst slurry including a catalyst component is performed. As shown in FIG. 6, in the honeycomb structure of the present embodiment, when a catalyst slurry 21 is introduced into each of the large pores 15, water 22 in the catalyst slurry 21 is absorbed by the small pores 16. As a consequence, as shown in FIG. 7, the large pore 15 of the partition wall 1 is almost filled with the solid component 23 in the catalyst slurry 21, i.e., the catalyst component.

Figure 7:
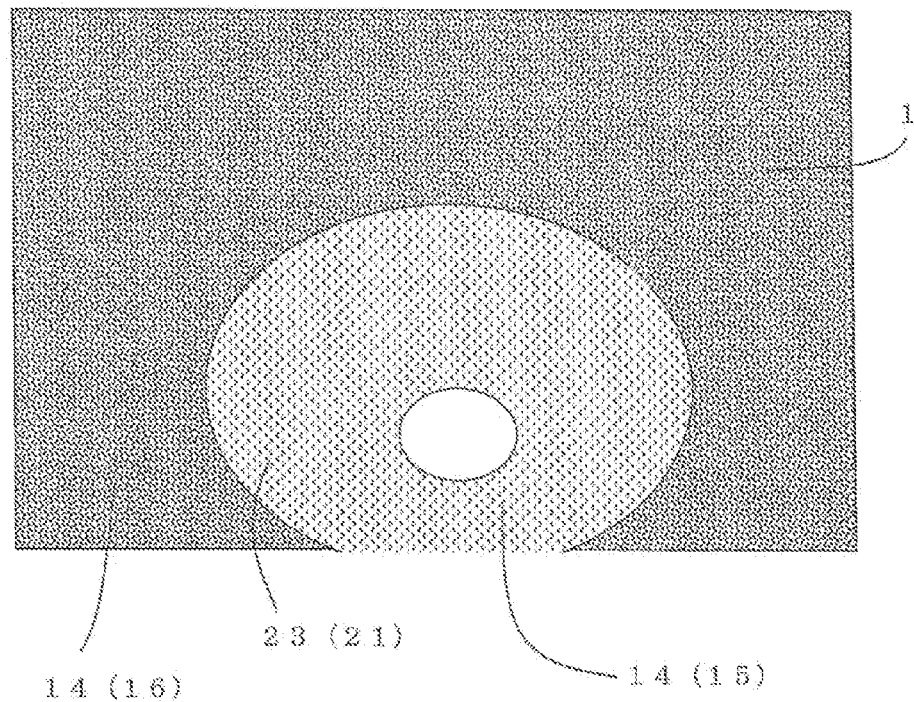
FIG. 7 is a schematic view showing that the pore of the partition wall shown in FIG. 5 is filled with the catalyst slurry.

Here, FIG. 6 and FIG. 7 are schematic views showing that the pores of the partition walls shown in FIG. 5 are filled with the catalyst slurry. In FIG. 6, arrows denoted with a reference numeral 22 show that the water 22 in the catalyst slurry 21 is absorbed by the small pores 16. The solid component 23 in the catalyst slurry 21 is dried or fired to become the catalyst. The solid component 23 in the catalyst slurry 21 is deposited on the surfaces of the partition walls 1 to form a catalyst layer sometimes. The filling of the pores in the partition walls with the catalyst and the depositing of the catalyst on the surfaces of the partition walls are generically referred to as "the loading of the catalyst on the partition walls."

In the honeycomb structure 100 of the present embodiment shown in FIG. 1 to FIG. 7, a large amount of the catalyst slurry 21 can be introduced into the large pores 15. Furthermore, by a capillary phenomenon of the small pores 16 formed around the large pores 15, the water of the catalyst slurry 21 in the large pores 15 is absorbed into the area where the small pores 16 are formed.

In the honeycomb structure 100 of the present embodiment shown in FIG. 1 to FIG. 5, a porosity of the partition walls 1 is from 50 to 70%. Moreover, in the honeycomb structure 100 of the present embodiment, a porosity of the large pores 15 of the partition walls 1 is 30% or larger. The respective porosities are measured by the mercury intrusion porosimetry. For example, the porosity of the partition walls 1 can be measured with a mercury porosimeter. Examples of the mercury porosimeter can include a meter manufactured by Micromeritics Co. and having a trade name: Autopore 9500.

"The porosity of the partition walls 1" means the porosity obtained from volumes of the pores 14 including all the small pores 16 and large pore 15 formed in the partition walls 1. "The porosity of the large pores 15 of the partition walls 1" means the porosity obtained from the volumes of the large pores 15 formed in the partition walls 1. In the present invention, the measured porosity of the pores having all the pore diameters, as objects, by the mercury porosimeter is "the porosity of the partition walls". Moreover, in the present invention, the measured porosity of the pores having the pore diameters of 14 μm or larger, as objects, by the mercury porosimeter is "the porosity of the large pores of the partition walls".

Further in the honeycomb structure 100 of the present embodiment, a ratio of a total volume of the small pores 16 formed in the partition walls 1 to a total volume of the large pores 15 formed in the partition walls 1 is 20% or larger. The total volume of the large pores 15 and the total volume of the small pores 16 are values measured by the mercury intrusion porosimetry. As the mercury porosimeter, a meter similar to that for use in the measurement of the porosity can be used.

In the present invention, the total of the measured pore volumes of the pores having the pore diameters of 14 μm or larger, as the objects, by the mercury porosimeter is "the total volume of the large pores 15." Moreover, in the present invention, a total of the measured pore volumes of the pores having the pore diameters which are smaller than 14 μm, as the objects, by the mercury porosimeter is "the total volume of the small pores 16." The terms "the total volume of the large pores 15" and "the total volume of the small pores 16" are generically referred to simply as "the total volume of the pores." Furthermore, the term "the ratio of the total volume of the small pores formed in the partition walls to the total volume of the large pores formed in the partition walls" is referred to simply as "the ratio of the total volume of the pores."

When the "the porosity of the large pores 15 of the partition walls 1" and "the total volume of the large pores 15" are set to the above numeric ranges, a sufficient amount of the catalyst slurry can be introduced into the large pores 15. Consequently, in the honeycomb catalyst body in which the honeycomb structure 100 is the catalyst carrier, a high purification performance can be realized.

Furthermore, when "the porosity of the partition walls 1" and "the total volume of the small pores 16" are set to the above numeric range, at the introduction of the catalyst slurry, the small pores can suitably absorb (i.e., discharge) the water of the catalyst slurry in the large pores 15. When the water of the catalyst slurry is suitably absorbed, the introduction of the catalyst slurry into the large pores 15 is further promoted, and the catalyst component finally remaining in the large pores 15 further increases.

Additionally, in the honeycomb structure 100 of the present embodiment, the pore diameter at a maximum peak value of the pore volumes in the distribution of the large pores is from 20 to 200 μm in the graph showing the pore diameter distribution of the partition walls 1 (e.g., see FIG. 8). Moreover, the pore diameter at a maximum peak value of the pore volumes in the distribution of the small pores is from 0.1 to 8 μm in the graph showing the pore diameter distribution of the partition walls 1.

"The distribution of the large pores" means a distribution on a side of larger pore diameters in the pore diameter distribution showing the bimodal distribution (i.e., the distribution on the larger pore diameter side in the two-peaks distribution). "The distribution of the small pores" means a distribution on a side of smaller pore diameters in the pore diameter distribution showing the bimodal distribution (i.e., the distribution on the smaller pore diameter side in the two-peaks distribution).

"The maximum peak value of the pore volumes in the distribution of the large pores" means the value of the peak of the distribution at which the pore volumes indicate the maximum value in the larger pore diameter side distribution in the pore diameter distribution showing the bimodal distribution. "The maximum peak value of the pore volumes in the distribution of the small pores" means the value of the peak of the distribution at which the pore volumes show the maximum value in the smaller pore diameter side distribution in the pore diameter distribution showing the bimodal distribution.

The term "the pore diameter at the maximum peak value" means the value of the pore diameter at the peak of the distribution at which the pore volumes show the maximum value. That is, the pore diameter means the value of the pore diameter at the peak of the distribution at which the log differential pore volumes show the maximum value in the graph showing the pore diameter distribution in which the abscissa shows the pore diameters and the ordinates shows the log differential pore volumes. Hereinafter, the term "the pore diameter at the maximum peak value of the pore volumes in the distribution of the large pores" will be referred to as "the pore diameter of the maximum peak value of the large pores." Moreover, the term "the pore diameter at the maximum peak value of the pore volumes in the distribution of the small pores" will be referred to as "the pore diameter of the maximum peak value of the small pores."

When the pore diameter at the maximum peak value of the respective pores is set to the above numeric range, the absorption of the water of the catalyst slurry can be promoted. That is, when the pore diameters of the small pores are made smaller, the water can easily be absorbed by the capillary phenomenon. In addition, when the pore diameters of the large pores are made larger, the catalyst slurry including the solid component can more easily permeates the large pores.

Furthermore, in the honeycomb structure 100 of the present embodiment, a value obtained by dividing a porosity value (%) of the large pores 15 by a thickness value (μm) of the partition walls is 0.2 or larger. That is, the value of "P/t" is 0.2 or larger, in which "P(%)" is the value of the porosity of the large pores 15, and "t (μm)" is the value of the thicknesses of the partition walls. According to such a constitution, the large pores 15 are easily continuously formed in the partition walls 1 of the honeycomb structure 100. For example, as shown in FIG. 4, the plurality of spherical or elliptic large pores 15 are easily formed in the partition walls 1 so that the pores are superimposed on one another. Thus, the continuity of the plurality of large pores 15 is acquired, and the catalyst slurry introduced into one of the large pores 15 moves among the large pores 15, and is introduced into the other large pores 15. In consequence, the catalyst slurry is suitably introduced into the large pore 15 formed in the vicinity of the center of the partition wall 1 in a thickness direction.

As described above, in the honeycomb structure 100 of the present embodiment, the large pores 15 of the partition walls 1 can be filled with a large amount of catalyst. That is, in the honeycomb structure 100 of the present embodiment, effects produced by constitutions such as the above-mentioned ratio of the total volume of the pores are combined, whereby the pores 14 can be filled with the large amount of the catalyst. In the honeycomb catalyst body in which the honeycomb structure 100 of the present embodiment is the catalyst carrier, a high purification performance can be realized.

Figure 9:
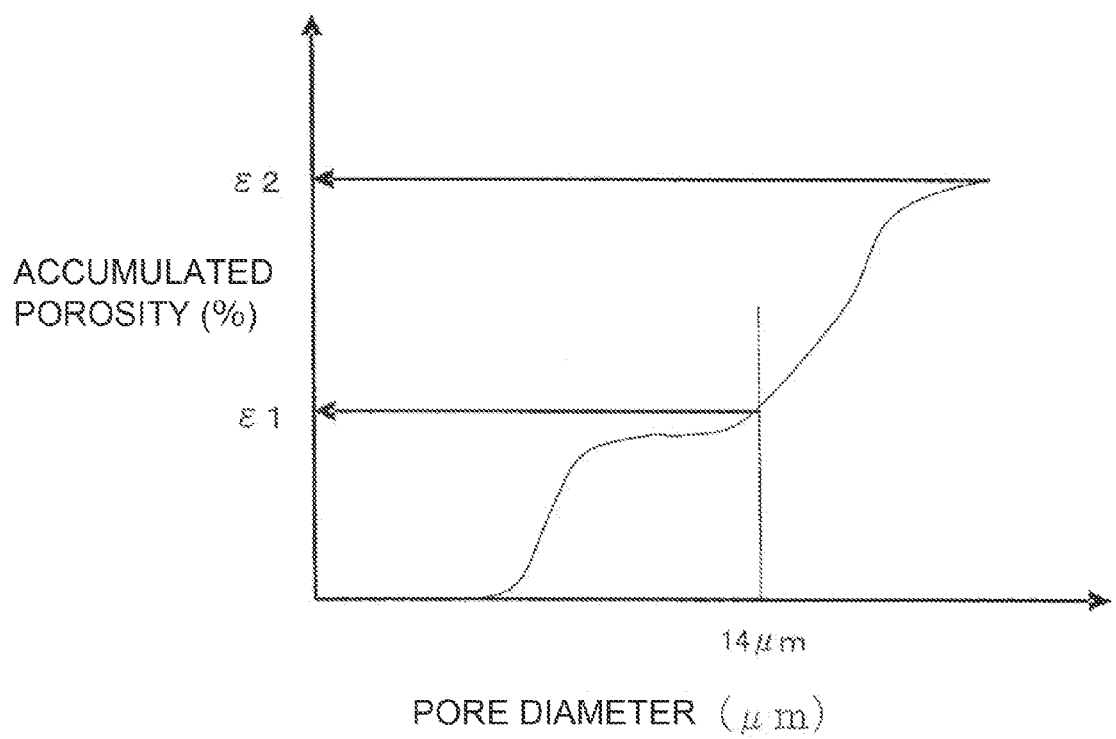
FIG. 9 is a graph showing a relation between an accumulated porosity and each of pore diameters in the embodiment of the honeycomb structure of the present invention.

It is to be noted that in the honeycomb structure of the present embodiment, the following relation is shown in a graph showing a relation between an accumulated porosity and the pore diameter. Here, FIG. 9 is the graph showing the relation between the accumulated porosity and the pore diameter in the embodiment of the honeycomb structure of the present invention. In the graph of FIG. 9, the abscissa shows the pore diameters (μm). In the graph of FIG. 9, the ordinate shows the accumulated porosity (%). In the graph of FIG. 9, "∈1" of the ordinate is "the porosity" of the small pores of the partition walls". In the graph of FIG. 9, "∈2" of the ordinate is "the porosity" of the partition walls". Therefore, a value of "∈2−∈1" is "the porosity of the large pores of the partition walls". In FIG. 9, the accumulated porosity and the pore diameters are values measured by the mercury intrusion porosimetry.

The honeycomb structure of the present embodiment satisfies relations of the following formulas (1) to (3) as seen from the graph shown in FIG. 9.

$$50\% \leq \in2 \leq 70\% \quad (1)$$

$$30\% \leq \in2 - \in1 \quad (2)$$

$$20\% \leq \in1/(\in2 - \in1) \quad (3)$$

In the honeycomb structure of the present embodiment, the porosity of the partition walls is from 50 to 70%, but the porosity of the partition walls is preferably from 55 to 65%, and further preferably from 60 to 65%. When the porosity of the partition walls is excessively high, a strength of the honeycomb structure deteriorates sometimes. On the other hand, when the porosity of the partition walls is excessively low, the volumes of the pores which can be filled with the catalyst become remarkably small. Especially in an SCR catalyst for the purification of nitrogen oxides and the like, an amount of the SCR catalyst has a very large influence on the purification performance. When the porosity of the partition walls is excessively low, it is difficult to realize a sufficient purification performance in a case where the catalyst is loaded on the partition walls of the honeycomb structure.

In the honeycomb structure of the present embodiment, the porosity of the large pores of the partition walls is 30% or larger. In the honeycomb structure of the present embodiment, the porosity of the large pores of the partition walls is preferably from 35 to 45%, and further preferably from 35 to 40%. When the porosity of the large pores of the partition walls is excessively low, the amount of the catalyst with which the large pores can be filled becomes remarkably small. For example, even when a large number of the small pores which are not easily filled with the catalyst component of the catalyst slurry are formed, it is difficult to suitably introduce the catalyst slurry. It is to be noted that an upper limit value of the porosity of the large pores of the partition walls can be specified by the ratio of the total volume of the pores.

In the honeycomb structure of the present embodiment, the ratio of the total volume of the small pores to the total volume of the large pores is 20% or larger. In the honeycomb structure of the present embodiment, the ratio of the total volume of the small pores to the total volume of the large pores is preferably from 20 to 50%, and further preferably from 25 to 40%. When the above-mentioned ratio of the total volume of the pores is excessively small, through channels through which the water of the catalyst slurry is discharged from the large pores decrease. Therefore, it is difficult to promote the introduction of the catalyst slurry into the large pores.

In the honeycomb structure of the present embodiment, the pores having the pore diameters of 14 μm or larger are the large pores. Moreover, the pore diameter of the maximum peak value of the large pores is from 20 to 200 μm. In the honeycomb structure of the present embodiment, the pore diameter of the maximum peak value of the large pores is preferably from 25 to 150 μm, and further preferably from 30 to 120 μm. When the pore diameter of the maximum peak value of the large pores is excessively large, the following problem occurs sometimes. When the partition walls of the honeycomb structure are coated with the catalyst slurry, an excessive slurry is blown and flown with air, after coating the walls with the catalyst slurry. When the pore diameter of the maximum peak value of the large pores is excessively large, even the catalyst slurry introduced into the large pores is blown and flown sometimes in a step of blowing and flying the excessive slurry with the air. In consequence, an introducing ratio of the catalyst into the large pores deteriorates sometimes. On the other hand, when the pore diameter of the maximum peak value of the large pores is excessively small, the catalyst slurry does not easily permeate the large pores. Moreover, the pore diameters of the large pores are preferably over 1.5 times the average pore diameter of the partition walls.

Moreover, in the honeycomb structure of the present embodiment, the pores having the pore diameters which are smaller than 14 μm are the small pores. Furthermore, the pore diameter of the maximum peak value of the small pores is from 0.1 to 8 μm. In the honeycomb structure of the present embodiment, the pore diameter of the maximum peak value of the small pores is preferably from 0.5 to 6 μm, and further preferably from 0.5 to 5 μm. When the pore diameters are set to the above-mentioned numeric range, the water of the catalyst slurry can suitably be absorbed by the capillary phenomenon of the small pores. Moreover, the pore diameters of the small pores are preferably 1/1.5 or smaller than the average pore diameter of the partition walls.

In the honeycomb structure of the present embodiment, the value "P/t" obtained by dividing the large pore porosity value P (%) by the partition wall thickness value t (μm) is 0.2 or larger. In the honeycomb structure of the present embodiment, the above "value of P/t" is preferably from 0.25 to 0.7, and further preferably from 0.3 to 0.7. When the above "value of P/t" is smaller than 0.2, each large pore is easily formed alone in the partition walls. That is, the continuity of the plurality of large pores is not easily obtained. For example, the catalyst slurry is not easily introduced into the large pore communicating with the surface of the partition wall through the small pores. On the other hand, the catalyst slurry is suitably introduced into the large pore having the open frontal area in the surface of the partition wall. When the plurality of large pores are continuously formed from the large pore having the open frontal area in the surface of the partition wall, the catalyst slurry is mutually introduced into the respective large pores through the large pores. The upper limit value of "the P/t values" is preferably 0.7. When "the P/t value" is in excess of 0.7, the catalyst slurry introduced into the large pores is blown and flown sometimes in the step of the blowing and flying the above excessive slurry with the air. Therefore, when "the P/t value" is in excess of 0.7, the introducing ratio of the catalyst into the pores further deteriorates sometimes.

Moreover, in the honeycomb structure of the present embodiment, the thicknesses of the partition walls are preferably from 50.8 to 254 μm, further preferably from 50.8 to 150 μm, and especially preferably from 50.8 to 125 μm. When the thicknesses of the partition walls are set to the above numeric range, the above large and small pores can suitably be formed in the partition walls of the honeycomb structure. Furthermore, a pressure loss can be decreased, while maintaining the strength of the partition walls.

"The thickness of each partition wall" means the thickness of the wall (the partition wall) to divide two adjacent cells in a cross section of the honeycomb structure which is cut vertically to a cell extending direction. "The thicknesses of the partition walls" can be measured by, for example, an image analysis device (manufactured by Nikon Corp., trade name "NEXIV, VMR-1515").

In the honeycomb structure of the present embodiment, a cell density of the honeycomb structure is preferably from 15.5 to 108.5 cells/cm$^2$. When the cell density is set to the above numeric range, the increase of the pressure loss can effectively be prevented. Moreover, when the catalyst is loaded on the partition walls of the honeycomb structure, the high purification performance can be obtained. The cell density of the honeycomb structure means the number of the cells per unit area in the cross section which is orthogonal to the cell extending direction. The cell density of the honeycomb structure is further preferably from 46.5 to 77.5 cells/cm$^2$, and especially preferably from 46.5 to 70 cells/cm$^2$.

Furthermore, a material of the partition walls of the honeycomb structure contains at least one type selected from the group consisting of cordierite, aluminum titanate, silicon carbide, and mullite. In particular, partition walls of the honeycomb structure further preferably include at least one type selected from the above group as a main component. According to such a constitution, thermal expansion of the honeycomb structure can be decrease, and a thermal shock resistance of the honeycomb structure can be enhanced. Examples of components other than the main component can include alumina, silica, titania, and glass.

In the present description, "the main component" means the component having a content of 90 mass % or more in a constitutional material. The partition walls are further preferably made of a material containing 95 mass % or more of at least one type selected from the above group, and especially preferably made of a material containing 98 mass % or more.

There are not any special restrictions on a shape of the honeycomb structure. Examples of the shape of the honeycomb structure include a tubular shape (a cylindrical shape) in which an end surface of the honeycomb structure has a round shape, a tubular shape in which the end surface has an oval shape, and a tubular shape in which the end surface has a polygonal shape. Examples of the polygonal shape include a quadrangular shape, a pentangular shape, a hexagonal shape, a heptagonal shape, and an octagonal shape. FIG. 1 to FIG. 4 show an example of a case where the honeycomb structure has a tubular shape in which the end surface has a round shape.

Examples of a shape of the cells in the cross section which is orthogonal to the cell extending direction can include a quadrangular shape, a hexagonal shape, an octagonal shape, a round shape and combinations of these shapes. In the quadrangular shape, a square shape or a rectangular shape is preferable.

The honeycomb structure 100 shown in FIG. 1 further includes the outer peripheral wall 3 positioned in the outermost periphery. The honeycomb structure 100 of the present embodiment does not have to include the outer peripheral wall 3. The outer peripheral wall 3 may be formed together with the partition walls 1, when a honeycomb formed body is extruded in a process of preparing the honeycomb structure 100. Moreover, at the extrusion forming, the outer peripheral wall does not have to be formed. For example, an outer peripheral portion of the partition walls 1 to divide and form the cells 2 may be coated with a ceramic material, whereby the outer peripheral wall 3 can be formed.

(2) Manufacturing Method of Honeycomb Structure

Next, a manufacturing method of the honeycomb structure of the present embodiment will be described. Examples of the manufacturing method of the honeycomb structure of the present embodiment can include a manufacturing method including a kneaded material preparing step, a forming step, and a firing step.

In the manufacturing method of the honeycomb structure of the present embodiment, particle diameters of a pore former to be added to a forming raw material are regulated in the kneaded material preparing step. According to such a constitution, it is possible to manufacture the honeycomb structure of the present embodiment in which the large pores and the small pores are formed in the partition walls. Hereinafter, each of the steps of the manufacturing method of the honeycomb structure of the present embodiment will be described.

(2-1) Kneaded Material Preparing Step:

First, when the honeycomb structure of the present embodiment is manufactured, forming raw materials containing a ceramic raw material are mixed and kneaded to obtain a kneaded material (the kneaded material preparing step). As the ceramic raw material, a cordierite forming raw material, cordierite, aluminum titanate, silicon carbide, mullite or the like can be used. It is to be noted that the cordierite forming raw material is the ceramic raw material blended so as to obtain a chemical composition in a range including 42 to 56 mass % of silica, 30 to 45 mass % of alumina, and 12 to 16 mass % of magnesia. The cordierite forming raw material is fired to become cordierite.

It is to be noted that the forming raw material is preferably prepared by further mixing the ceramic raw material with a dispersion medium, a pore former, an organic binder, an inorganic binder, a surfactant and the like. There are not any special restrictions on composition ratios of the respective raw materials, and the composition ratios are preferably set in accordance with a structure, a material and the like of the honeycomb structure to be prepared.

When the honeycomb structure of the present embodiment is manufactured, two types of pores, i.e., the large pores and the small pores are preferably formed in the partition walls, by, for example, the following method. As a method of forming the small pores, first, fine particles having small particle diameters are used as the ceramic raw material, so that the pores formed of the ceramic raw material itself are made as small as possible. The ceramic raw material is preferably such a raw material that the porosity of the pores formed of the ceramic raw material itself is 5% or smaller.

Then, the pore former for the small pores which has small and uniform particle diameters is added to the forming raw material. Thus, the small pores can be formed in the partition walls. The pore former for the small pores can form the small pores in the honeycomb structure of the present embodiment, when a formed body obtained by forming the kneaded material is fired.

The particle diameters of the pore former for the small pores can suitably be selected in accordance with the pore diameters of the small pores in the honeycomb structure to be obtained. Moreover, an amount of the pore former for the small pores to be added can suitably be selected in accordance with the porosity of the small pores in the honeycomb structure to be obtained, or the like. The pore former for the small pores preferably has comparatively uniform particle diameters. For example, the pore former for the small pores preferably has a sharp particle diameter distribution.

Examples of a method of forming the large pores can include a method of adding, to the forming raw material, a pore former for large pores to form the large pores separately from the pore former for the small pores. Thus, the large pores can be formed in the partition walls. The pore former for the large pores can form the large pores in the honeycomb structure of the present embodiment, when the formed body obtained by forming the kneaded material is fired. The particle diameters of the pore former for the large pores can suitably be selected in accordance with the pore diameters of the large pores in the honeycomb structure to be obtained. For example, a pore former having an average particle diameter of 20 μm or larger is preferably used. Examples of the pore former for the large pores can include resin particles, carbon, starch and the like. Moreover, an amount of the pore former for the large pores to be added can suitably be selected in accordance with the porosity of the large pores in the honeycomb structure to be obtained, or the like.

As the dispersion medium, water can be used. An amount of the dispersion medium to be added is preferably from 10 to 30 parts by mass to 100 parts by mass of the ceramic raw material.

Examples of the organic binder can include methylcellulose, hydroxypropyl methylcellulose, hydroxypropyl ethyl cellulose, hydroxyethyl cellulose, carboxymethylcellulose, polyvinyl alcohol, and combinations of them. Moreover, an amount of the organic binder to be added is preferably from 3 to 8 parts by mass to 100 parts by mass of the ceramic raw material.

As the surfactant, ethylene glycol, dextrin, fatty acid soap, polyalcohol or the like can be used. These surfaces may be used alone, or two or more of the surfactants may be combined and used. An amount of the surfactant to be added is preferably from 0.2 to 0.5 parts by mass to 100 parts by mass of the ceramic raw material.

There are not any special restrictions on a method of kneading the forming raw material to form the kneaded material, and examples of the method can include methods using a kneader, a vacuum clay kneader and the like.

(2-2) Forming Step:

Next, the obtained kneaded material is formed into a honeycomb shape to obtain the honeycomb formed body (the forming step). There are not any special restrictions on a method of forming the kneaded material to obtain the honeycomb formed body. Examples of the method of forming the honeycomb formed body can include known forming methods such as extrusion forming and injection forming. The examples can include a suitable example such as a method of performing the extrusion forming by use of a die having a desirable cell shape, partition wall thickness and cell density. As a material of the die, a hard metal which does not easily wear is preferable.

There are not any special restrictions on a shape of the honeycomb formed body, and a cylindrical shape, a tubular shape in which an end surface has an elliptic shape, a polygonal tubular shape in which an end surface has a polygonal shape such as "the square shape, the rectangular shape, the triangular shape, the pentangular shape, the hexagonal shape or the octagonal shape", or the like is preferable.

(2-3) Firing Step:

Next, the obtained honeycomb formed body is dried and fired to obtain a honeycomb structure including porous partition walls to divide and form a plurality of cells which become through channels of a fluid (the firing step). As described above, in the manufacturing method of the honeycomb structure of the present embodiment, two types of pore formers are added to the kneaded material, whereby it is possible to manufacture the honeycomb structure in which the large pores and the small pores are formed in the partition walls.

There are not any special restrictions on a drying method, but examples of the drying method can include hot air drying, microwave drying, dielectric drying, reduced-pressure drying, vacuum drying, and freeze drying. Above all, the dielectric drying, the microwave drying or hot air drying is preferably performed alone or as a combination thereof.

Prior to firing the honeycomb formed body, this honeycomb formed body is preferably calcinated. The calcinating is performed for degreasing. There are not any special restrictions on the calcinating, as long as at least part of organic materials (the organic binder, the surfactant, the pore former, etc.) in the honeycomb formed body can be removed. In general, a burning temperature of the organic binder is from about 100 to 300° C. Therefore, as calcinating conditions, heating is preferably performed at a temperature of about 200 to 1000° C. in oxidation atmosphere for 10 to 100 hours.

The honeycomb formed body is fired so that the forming raw material constituting the calcinated formed body is sintered and densified. By such firing, the partition walls have a predetermined shape. Firing conditions can suitably be selected in accordance with a type of the forming raw material. That is, suitable conditions of a firing temperature, a firing time, a firing atmosphere and the like may be selected in accordance with the type of the forming raw material. For example, when the cordierite forming raw material is used, the firing temperature is preferably from 1350 to 1440° C. Moreover, as the firing time, a keeping time at the highest temperature is preferably from 3 to 10 hours. There are not any special restrictions on a device which performs the calcinating and firing. Examples of the device which performs the calcinating and firing can include an electric furnace, and a gas furnace.

(3) Honeycomb Catalyst Body:

Next, an embodiment of a honeycomb catalyst body of the present invention will be described. The honeycomb catalyst body of the present embodiment is a honeycomb catalyst body 200 shown in FIG. 10 to FIG. 14. The honeycomb catalyst body 200 of the present embodiment includes the honeycomb structure 100 of the present invention described above, and an SCR catalyst 60 which selectively reduces components to be purified. The honeycomb structure 100 is a honeycomb catalyst carrier in the honeycomb catalyst body 200.

Figure 10:
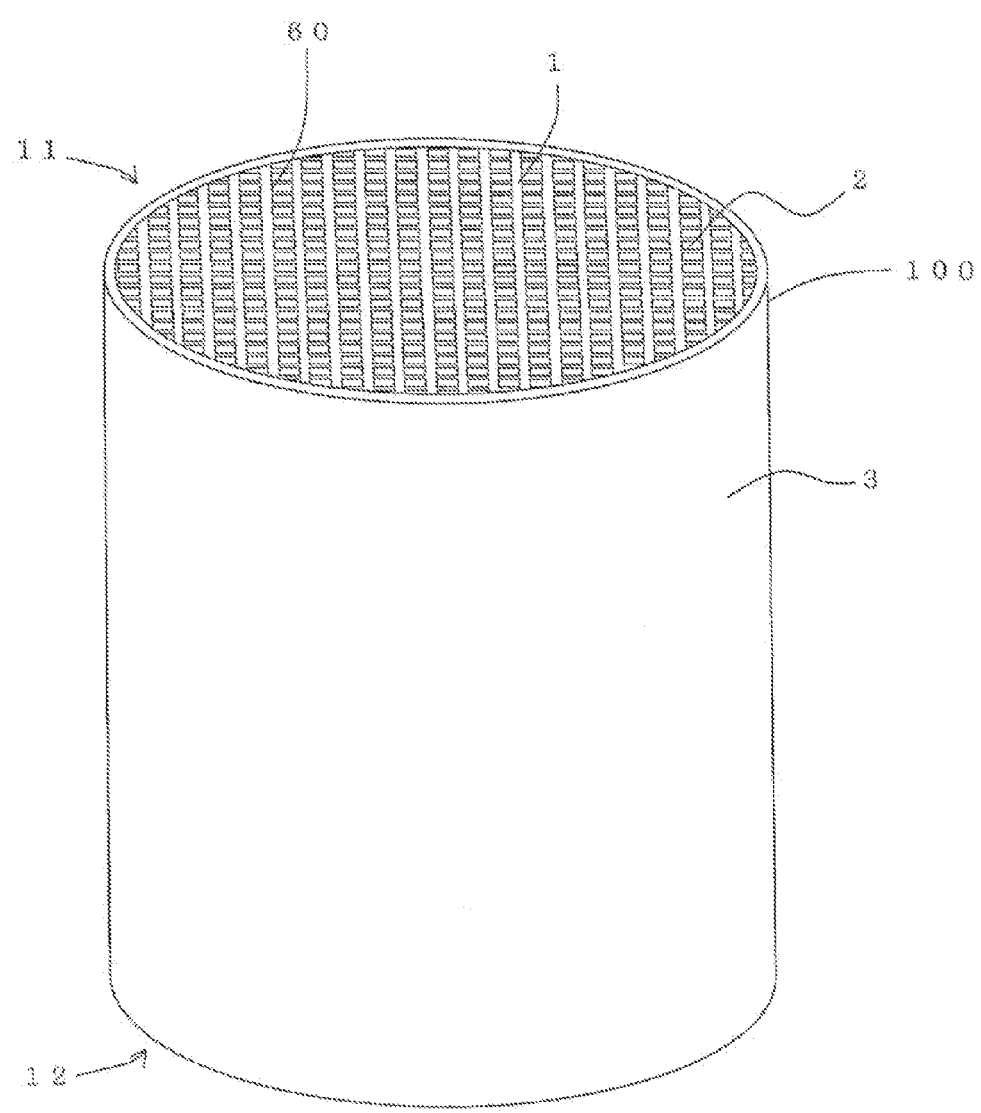
FIG. 10 is a perspective view schematically showing an embodiment of a honeycomb catalyst body of the present invention.
Figure 11:
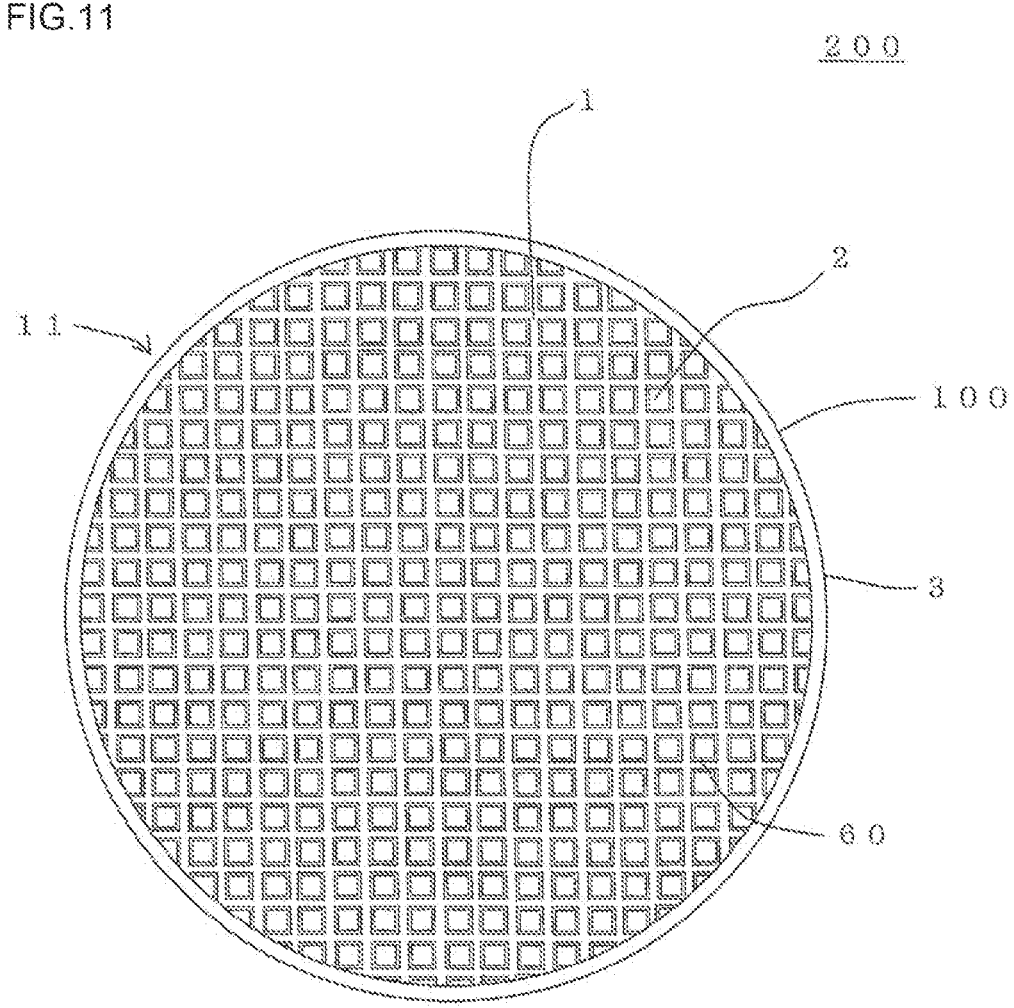
FIG. 11 is a plan view schematically showing one end surface side of the embodiment of the honeycomb catalyst body of the present invention.
Figure 12:
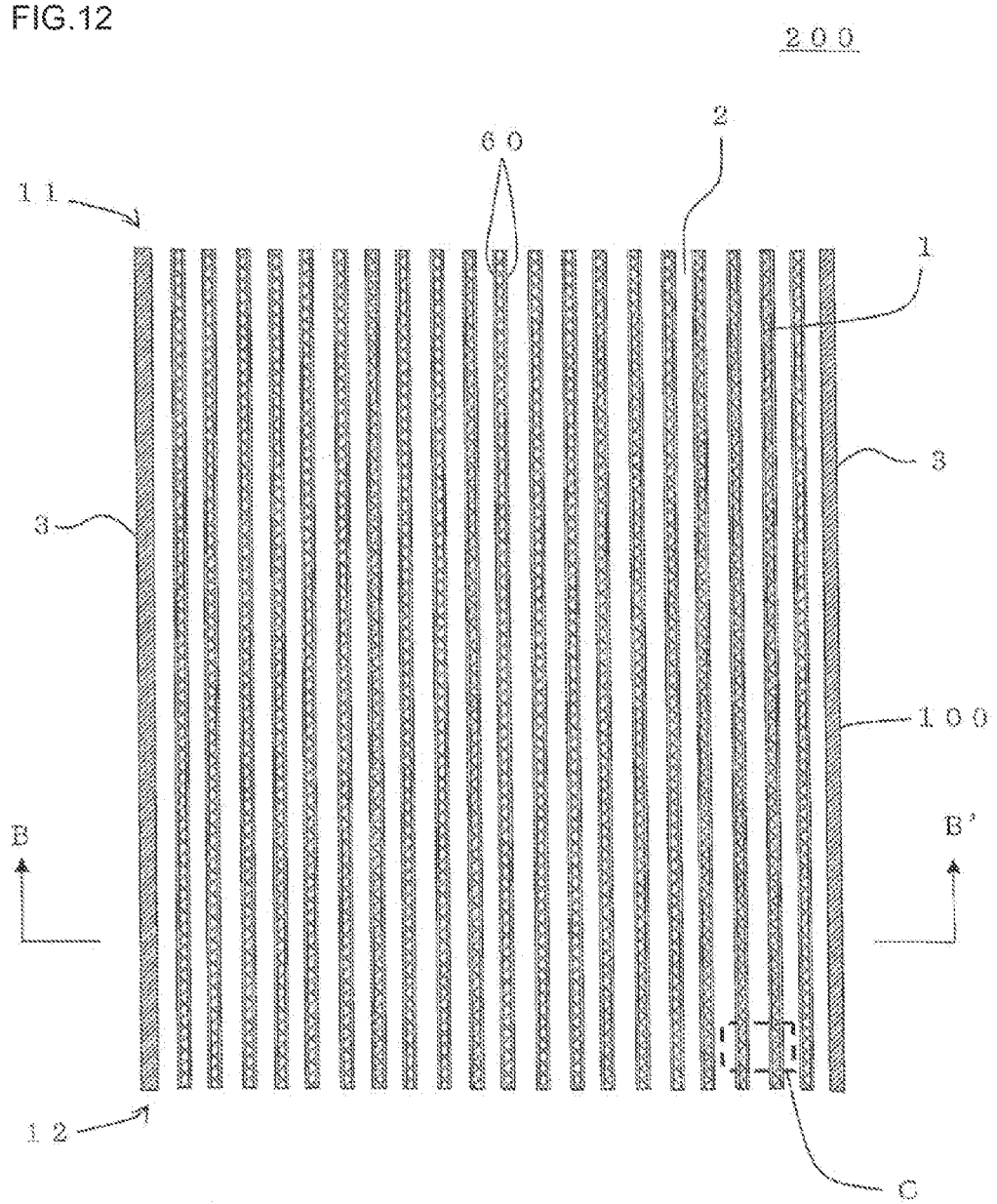
FIG. 12 is a sectional view schematically showing a cross section which is parallel to a cell extending direction in the embodiment of the honeycomb catalyst body of the present invention.
Figure 13:
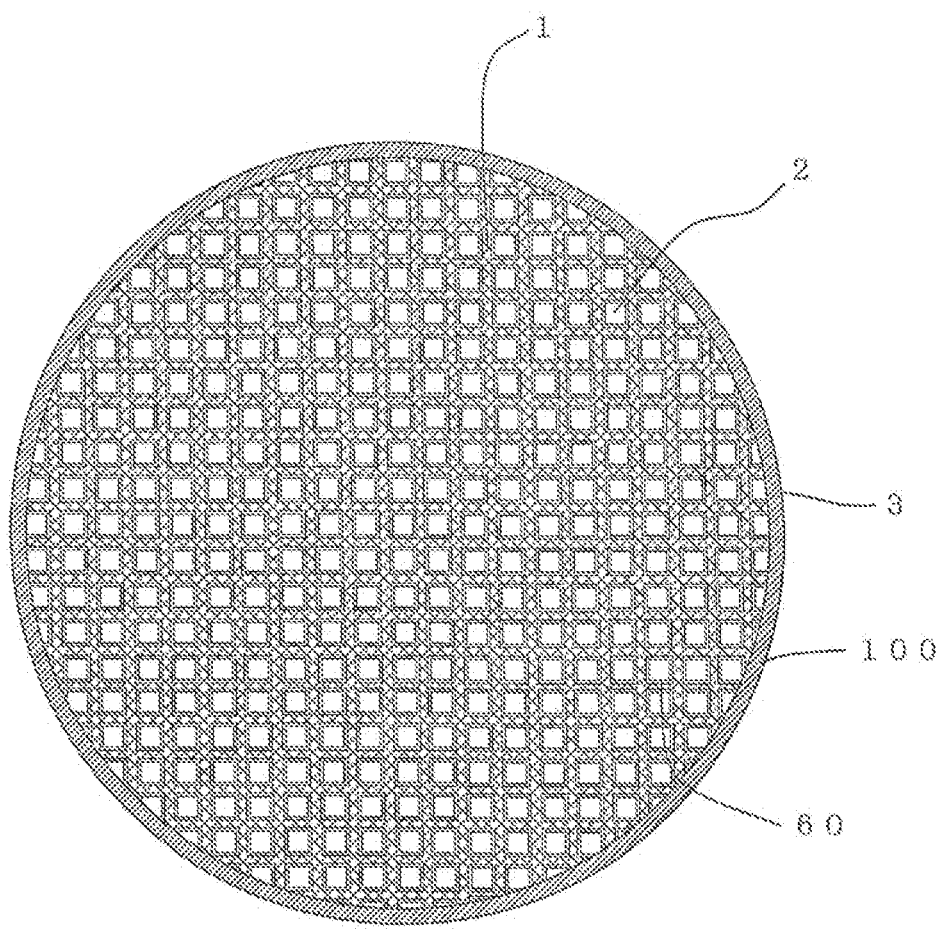
FIG. 13 is a sectional view schematically showing a cross section cut along the B-B' line of FIG. 12.

Here, FIG. 10 is a perspective view schematically showing the embodiment of the honeycomb catalyst body of the present invention. FIG. 11 is a plan view schematically showing one end surface side of the embodiment of the honeycomb catalyst body of the present invention. FIG. 12 is a sectional view schematically showing a cross section which is parallel to a cell extending direction in the embodiment of the honeycomb catalyst body of the present invention. FIG. 13 is a sectional view schematically showing a cross section cut along the B-B' line of FIG. 12. FIG. 14 is a schematic view in which an area shown in C of FIG. 12 is enlarged.

The honeycomb structure 100 includes porous partition walls 1 to divide and form a plurality of cells 2 which extend from one end surface 11 to the other end surface 12 and become through channels of a fluid. The honeycomb structure 100 shown in FIG. 10 to FIG. 13 further includes an outer peripheral wall 3 positioned in the outermost periphery. The honeycomb structure 100 has a tubular shape including the partition walls 1 and the outer peripheral wall 3. A constitution of the honeycomb structure 100 is described in the embodiment of the honeycomb structure of the present invention.

In the honeycomb catalyst body 200 of the present embodiment shown in FIG. 10 to FIG. 14, pores 14 formed in the partition walls 1 of the honeycomb structure 100 are filled with the SCR catalyst 60. Especially, large pores 15 formed in the partition walls 1 are filled with a large amount of the SCR catalyst 60. Needless to say, small pores 16 formed in the partition walls 1 may be filled with the SCR catalyst 60. Moreover, although not shown, the SCR catalyst 60 may be disposed on the surfaces of the partition walls 1. Hereinafter, "the filling of the pores 14 of the partition walls 1 with the SCR catalyst 60" and "the disposing of the SCR catalyst 60 on the surfaces of the partition walls 1" will generically be referred to as "the loading of the SCR catalyst 60 on the partition walls 1" sometimes.

The SCR catalyst is a catalyst which selectively reduces the components to be purified. Especially in the honeycomb catalyst body of the present embodiment, the SCR catalyst is preferably an $NO_x$ selective reducing SCR catalyst which selectively reduces nitrogen oxides ($NO_x$) in the exhaust gas. Suitable examples of the $NO_x$ selective reducing SCR catalyst can include a catalyst which selectively reduces $NO_x$ in the exhaust gas of a diesel engine to purify the exhaust gas.

Examples of the SCR catalyst can include a metal-substituted zeolite. Examples of a metal of the metal-substituted zeolite can include iron (Fe) and copper (Cu). Suitable examples of the zeolite can include a beta zeolite.

Moreover, the SCR catalyst may be a catalyst containing at least one type selected from the group consisting of vanadium and titania as a main component. A content of vanadium or titania in the SCR catalyst is preferably 60 mass % or larger.

There are not any special restrictions on an amount of the SCR catalyst to be loaded on the partition walls. Hereinafter, the amount of the SCR catalyst to be loaded on the partition walls will be referred to as "the loading amount" sometimes. The loading amount (g/L) per unit volume of the honeycomb structure is preferably 200 g/L or larger. According to such a constitution, the components to be purified can suitably be purified. An upper limit of the loading amount (g/L) of the SCR catalyst is preferably, for example, 400 g/L. When the loading amount of the SCR catalyst is in excess of 400 g/L, the amount of the SCR catalyst is excessively large, and hence a pressure loss increases sometimes. Therefore, the loading amount of the SCR catalyst is further preferably from 200 to 350 g/L, and especially preferably from 200 to 300 g/L.

As described above, small pores and large pores are formed in the partition walls of the honeycomb structure for use in the honeycomb catalyst body of the present embodiment. The SCR catalyst is loaded on the partition walls of the honeycomb structure by the catalyst coating with a catalyst slurry including a catalyst component. When the catalyst slurry is introduced into the large pores, a water of the catalyst slurry is absorbed by a capillary phenomenon of the small pores. Therefore, in the honeycomb catalyst body of the present embodiment, the pores are filled with a larger amount of the SCR catalyst than in a conventional honeycomb catalyst body. That is, when conditions to load the SCR catalyst on the honeycomb structure are the same, the amount of the SCR catalyst with which the pores are filled becomes larger in the honeycomb catalyst body of the present embodiment.

Therefore, when the loading amount of the SCR catalyst in the honeycomb catalyst body of the present embodiment is the same as that in the conventional honeycomb catalyst body, a thickness of a layer of the SCR catalyst disposed on the surfaces of the partition walls can be made smaller. When the thickness of the layer of the SCR catalyst becomes large, an open area ratio of the honeycomb catalyst body lowers, and the pressure loss of the honeycomb catalyst body increases. In the honeycomb catalyst body of the present embodiment, when the thickness of the layer of the SCR catalyst is made smaller, the increase of the pressure loss can be suppressed.

A manufacturing method of the honeycomb catalyst body of the present embodiment is as follows. First, the honeycomb structure which becomes a catalyst carrier to load the SCR catalyst is prepared. Next, the SCR catalyst is loaded on the partition walls of the obtained honeycomb structure, to prepare the honeycomb catalyst body. The method of preparing the honeycomb structure can be performed in conformity to the method of manufacturing the embodiment of the above-mentioned honeycomb structure of the present invention.

A method of loading the SCR catalyst on the honeycomb structure to prepare the honeycomb catalyst body can be performed in conformity to the method of loading the SCR catalyst in a conventional manufacturing method of the honeycomb catalyst body. That is, when the honeycomb structure including the large pores and small pores formed in the partition walls is used as the catalyst carrier, the introduction of the catalyst slurry into the large pores is promoted. In consequence, even if a special method is not used as the method of loading the SCR catalyst, it is possible to manufacture the honeycomb catalyst body in which the pores are filled with the larger amount of the SCR catalyst.

Examples of the method of loading the SCR catalyst can include the following method. First, the catalyst slurry including the SCR catalyst is prepared. The partition walls of the honeycomb structure are coated with this catalyst slurry, to load the SCR catalyst on the partition walls of the honeycomb structure. When the partition walls of the honeycomb structure are coated with the catalyst slurry, the pores of the partition walls are filled with the catalyst slurry.

When the honeycomb catalyst body of the present embodiment is prepared, the pores of the partition walls are preferably filled with the larger amount of the SCR catalyst. In consequence, remaining voids of the pores of the partition walls can be decreased. Therefore, the thickness of the layer of the SCR catalyst on the surfaces of the partition walls can relatively be made smaller.

Examples of a method of filling the pores of the partition walls with the larger amount of the SCR catalyst can include a method of lowering a viscosity of the catalyst slurry. The viscosity of the catalyst slurry can be controlled by regulating a ratio of the water of the catalyst slurry. The viscosity of the catalyst slurry is preferably 8 mPa·s or smaller, further preferably from 7 to 5 mPa·s, and especially preferably from 7 to 6 mPa·s.

Moreover, examples of another method of filling the pores of the partition walls with the larger amount of the SCR catalyst can include a method of decreasing particle diameters of the SCR catalyst included in the catalyst slurry. The particle diameters of the SCR catalyst included in the catalyst slurry are preferably 10 μm or smaller, further preferably from 3 to 5 μm, and especially preferably from 4 to 5 μm.

Furthermore, when the partition walls of the honeycomb structure are coated with the catalyst slurry, the honeycomb structure is preferably contained in a container, and the catalyst slurry is introduced into this container. Prior to introducing the catalyst slurry into the container, the inside of the container containing the honeycomb structure is further preferably drawn to vacuum. When the inside of the container is drawn to vacuum, the pores of the partition walls are filled with the larger amount of the catalyst slurry.

After coating the partition walls of the honeycomb structure with the catalyst slurry, the catalyst slurry is dried. Furthermore, the dried catalyst slurry may be fired. Thus, the honeycomb catalyst body of the present embodiment can be manufactured.

EXAMPLES

Hereinafter, examples of the present invention will further specifically be described, but the present invention is not limited to these examples.

Example 1

First, a honeycomb structure for use in a honeycomb catalyst body was prepared. As a ceramic raw material to prepare the honeycomb structure, a cordierite forming raw material was used. To the cordierite forming raw material, a pore former, a dispersion medium, an organic binder and a dispersant were added, to prepare a kneaded material for forming. An amount of the dispersion medium to be added was 30 parts by mass to 100 parts by mass of the cordierite forming raw material. An amount of the organic binder to be added was 1 part by mass to 100 parts by mass of the cordierite forming raw material.

As the cordierite forming raw material, a material including 38.9 parts by mass of talc, 40.7 parts by mass of kaolin and 5.9 parts by mass of alumina was used. An average particle diameter of talc was 3 µm. An average particle diameter of kaolin was 1 µm. An average particle diameter of alumina was 0.3 µm. The above average particle diameter is a median diameter (d50) in a particle diameter distribution of each type of raw material particles. As the raw material particles of the cordierite forming raw material, particles having comparatively small and uniform particle diameters were used.

Concerning the pore former, starch having an average particle diameter of 3 µm was used as the pore former for the small pores. Moreover, hollow resin particles having an average particle diameter of 45 µm were used as the pore former for the large pores. An amount of the pore former for the small pores to be added was 10 parts by mass to 100 parts by mass of the cordierite forming raw material. An amount of the pore former for the large pores to be added was 10 parts by mass to 100 parts by mass of the cordierite forming raw material.

As the dispersion medium, water was used. As the organic binder, hydroxypropyl methylcellulose was used. As the dispersant, ethylene glycol was used.

Next, the obtained kneaded material was extruded by using a die to form a honeycomb formed body. Thus, the honeycomb formed body was prepared. Then, the honeycomb formed body was dried by a microwave drier. Both end surfaces of the dried honeycomb formed body were cut and adjusted to a predetermined dimension. Afterward, the honeycomb formed body was further dried by a hot air drier.

The dried honeycomb formed body was fired at 1445° C. for five hours. Thus, the honeycomb structure was prepared. A partition wall thickness of the honeycomb structure was 139.7 µm. A cell density of the honeycomb structure was 46.5 cells/cm$^2$. A porosity of the honeycomb structure was 50%. The porosity is a value measured with "Auto Pore III 9420 (trade name)" manufactured by Micromeritics Co.

Moreover, when a pore diameter distribution of the partition walls was measured, the pore diameter distribution showed a bimodal distribution. That is, large pores and small pores were formed in the partition walls of the obtained honeycomb structure. A porosity of the large pores of the partition walls was 30%. A porosity of the small pores of the partition walls was 7%.

Furthermore, a ratio of a total volume of the small pores formed in the partition walls to a total volume of the large pores formed in the partition walls was 23%. In Table 1, "the ratio of the total volume of the small pores formed in the partition walls to the total volume of the large pores formed in the partition walls" is shown as "the ratio of the total volume of the pores".

Moreover, in the pore diameter distribution of the partition walls, "the pore diameter of the maximum peak value of the large pores" was 50 µm. In the pore diameter distribution of the partition walls, "the pore diameter of the maximum peak value of the small pores" was 0.1 µm.

Furthermore, when a value of the partition wall thickness was "t (µm)" and a value of the porosity of the large pores was "P(%)", a value of "P/t" was 0.21. The respective measurement results are shown in Table 1.

TABLE 1

| | Partition wall thickness (t) (µm) | Cell density (cells/cm$^2$) | Porosity (%) | Porosity of large pores (P) (%) | Porosity of small pores (%) | Ratio of total volume of pores (%) | Pore dia. of maximum peak value of large pores (µm) | Pore dia. of maximum peak value of small pores (µm) | Value of P/t |
|---|---|---|---|---|---|---|---|---|---|
| Example 1 | 139.7 | 46.5 | 50 | 30 | 7 | 23 | 50 | 0.1 | 0.21 |
| Example 2 | 139.7 | 46.5 | 58 | 40 | 15 | 38 | 20 | 5 | 0.29 |
| Example 3 | 139.7 | 46.5 | 58 | 40 | 15 | 38 | 50 | 5 | 0.29 |
| Example 4 | 139.7 | 46.5 | 58 | 40 | 15 | 38 | 150 | 8 | 0.29 |
| Example 5 | 139.7 | 46.5 | 58 | 40 | 15 | 38 | 200 | 8 | 0.29 |
| Example 6 | 165.1 | 62.0 | 58 | 40 | 20 | 50 | 55 | 5 | 0.24 |
| Example 7 | 165.1 | 62.0 | 58 | 40 | 15 | 38 | 55 | 5 | 0.24 |
| Example 8 | 165.1 | 62.0 | 58 | 45 | 15 | 33 | 55 | 5 | 0.27 |
| Example 9 | 165.1 | 62.0 | 60 | 40 | 15 | 38 | 55 | 5 | 0.24 |
| Example 10 | 165.1 | 62.0 | 70 | 40 | 15 | 38 | 55 | 5 | 0.24 |
| Comparative Example 1 | 139.7 | 46.5 | 45 | 30 | 7 | 23 | 50 | 0.1 | 0.21 |
| Comparative Example 2 | 165.1 | 62.0 | 75 | 42 | 15 | 36 | 55 | 5 | 0.25 |
| Comparative Example 3 | 139.7 | 46.5 | 58 | 25 | 10 | 40 | 15 | 5 | 0.18 |
| Comparative Example 4 | 139.7 | 46.5 | 50 | 30 | 7 | 23 | 50 | 0.05 | 0.21 |
| Comparative Example 5 | 139.7 | 46.5 | 50 | 30 | 7 | 23 | 50 | 15 | 0.21 |
| Comparative Example 6 | 139.7 | 46.5 | 58 | 40 | 15 | 38 | 10 | 0.5 | 0.29 |
| Comparative Example 7 | 139.7 | 46.5 | 58 | 40 | 15 | 38 | 250 | 10 | 0.29 |

Next, an SCR catalyst was loaded on the obtained honeycomb structure, to prepare a honeycomb catalyst body. As the SCR catalyst, a Cu-substituted zeolite was used. As a method of loading the SCR catalyst, an immersion method was used. In the honeycomb catalyst body of Example 1, a loading amount of the SCR catalyst was 220 g/L. The loading amount (g/L) of the SCR catalyst is shown in Table 2.

TABLE 2

| | Catalyst loading amount (g/L) | Strength (MPa) | | Pressure loss (kPa) | | Purification ratio (%) | | General evaluation |
|---|---|---|---|---|---|---|---|---|
| Example 1 | 220 | 4.0 | ○ | 5.5 | ○ | 97 | ○ | ○ |
| Example 2 | 220 | 3.5 | ○ | 5.4 | ○ | 98 | ○ | ○ |
| Example 3 | 220 | 3.5 | ○ | 5.3 | ○ | 98 | ○ | ○ |
| Example 4 | 220 | 3.5 | ○ | 5.2 | ○ | 98 | ○ | ○ |
| Example 5 | 220 | 3.5 | ○ | 5 | ○ | 98 | ○ | ○ |
| Example 6 | 220 | 3.5 | ○ | 5.3 | ○ | 98 | ○ | ○ |
| Example 7 | 220 | 3.5 | ○ | 5.3 | ○ | 98 | ○ | ○ |
| Example 8 | 220 | 3.5 | ○ | 5.3 | ○ | 99 | ○ | ○ |
| Example 9 | 220 | 3.0 | ○ | 5.3 | ○ | 98 | ○ | ○ |
| Example 10 | 220 | 2.8 | ○ | 5.3 | ○ | 98 | ○ | ○ |
| Comparative Example 1 | 220 | 5.0 | ○ | 8.2 | X | 95 | ○ | X |
| Comparative Example 2 | 220 | 1.5 | X | 5.2 | ○ | 85 | X | X |
| Comparative Example 3 | 220 | 3.5 | ○ | 12.5 | X | 95 | ○ | X |
| Comparative Example 4 | 220 | 4.0 | ○ | 10.5 | X | 78 | X | X |
| Comparative Example 5 | 220 | 4.0 | ○ | 10.5 | X | 88 | X | X |
| Comparative Example 6 | 220 | 3.5 | ○ | 8.8 | X | 88 | X | X |
| Comparative Example 7 | 220 | 3.5 | ○ | 5.2 | ○ | 85 | X | X |

Next, as to the obtained honeycomb catalyst body, a strength, a pressure loss and a purification ratio were evaluated by the following method. Moreover, the general evaluation of the honeycomb catalyst bodies was performed from the obtained evaluation results. The results are shown in Table 2.

[Strength]

The strength of the honeycomb catalyst body was measured. The measurement of the strength was performed based on an isostatic breaking strength test stipulated by Automobile Standard (the JASO standard) M505-87 issued by the Society of Automotive Engineers of Japan. The isostatic breaking strength test is the test in which a honeycomb catalyst body is contained in a tubular container of a rubber, and the container is closed with an aluminum plate as a lid, to perform isotropic pressurizing compression in water. That is, the isostatic breaking strength test is the test in which there is simulated a compressive load weight when the outer peripheral surface of the honeycomb catalyst body is grasped by a converter can member. The isostatic breaking strength is represented by an applied pressure value (MPa) when the honeycomb catalyst body breaks. A case where the isostatic strength (the applied pressure value) was 2.0 MPa or larger was evaluated as "○ (passable)", and a case where the strength was smaller than 2.0 MPa was evaluated as "x (non-passable)".

[Pressure Loss]

Through the honeycomb catalyst body, air was allowed to flow at a flow velocity of 10 m³/min. on room temperature conditions, and a pressure on an inlet side of the honeycomb catalyst body and a pressure on an outlet side thereof were measured. A pressure difference between the pressure on the inlet side and the pressure on the outlet side was a pressure loss (the pressure loss (kPa)). A case where the pressure loss (kPa) was smaller than 8 kPa was evaluated as "○ (passable)", and a case where the pressure loss (kPa) was 8 kPa or larger was evaluated as "x (non-passable)".

[Purification Ratio]

The prepared honeycomb catalyst body was mounted on an exhaust system of a vehicle on which a gasoline engine of 2 liters displacement was mounted. A regulated operation mode (LA-4) of Federal Regulations (FTP) was performed, to measure hydrocarbon emissions. A purification ratio was calculated from a ratio between the measurement of the emissions and the measurement of emissions without any catalyst bodies. A case where the purification ratio (%) was 90% or larger was evaluated as "○ (passable)", and a case where the purification ratio (%) was smaller than 90% was evaluated as "x (non-passable)".

[General Evaluation]

When all the evaluation results were "○ (passable)" in the evaluations of the strength, the pressure loss and the purification ratio, the general evaluation was "○ (passable)". When at least one of the evaluation results was "x (non-passable)" in the evaluations of the strength and the purification ratio, the general evaluation was "x (non-passable)".

Examples 2 to 10 and Comparative Examples 1 to 7

In Examples 2 to 10 and Comparative Examples 1 to 7, first, honeycomb structures shown in Table 1 were prepared. Next, an SCR catalyst was loaded on each of the obtained honeycomb structures, to prepare a honeycomb catalyst body. A loading amount of the SCR catalyst of the honeycomb catalyst body of each of Examples 2 to 10 and Comparative Examples 1 to 7 was 220 g/L in the same manner as in Example 1. Moreover, a porosity of the honeycomb structure was regulated by regulating an average particle diameter of a pore former for small pores, an amount of the pore former to be added, an average particle diameter of a pore former for large pores, and an amount of the pore former to be added.

CONCLUSION

As shown in Table 2, the honeycomb catalyst bodies of Examples 1 to 10 indicated suitable results in all the evaluations.

In the honeycomb catalyst body of Comparative Example 1, a porosity of partition walls was low, and hence a pressure loss was high. In the honeycomb catalyst body of Comparative Example 2, a porosity of partition walls was high, and hence a strength was low.

In the honeycomb catalyst body of Comparative Example 3, a porosity of large pores of partition walls was low, and hence a pressure loss was high. A value of (P/t) was as large as 0.18, and hence continuity among the large pores was not acquired. In Comparative Example 3, filling properties of large pores with the SCR catalyst deteriorated, and a thickness of a catalyst layer on the surfaces of partition walls was excessively large. In consequence, a hydraulic diameter of cells of a honeycomb catalyst body was excessively small, which resulted in the increase of a pressure loss.

In the honeycomb catalyst body of Comparative Example 4, a pore diameter of a maximum peak value of small pores was excessively small, and hence a pressure loss was high. Moreover, in the honeycomb catalyst body of Comparative Example 4, a purification ratio was also poor. In Comparative Example 4, at catalyst loading, a water of a catalyst slurry was not suitably discharged through the small pores. Therefore, filling properties of large pores with the SCR catalyst deteriorated, and a thickness of a catalyst layer on the surface of each of the partition walls was excessively large. In consequence, hydraulic diameters of cells of the honeycomb catalyst body were excessively small, which resulted in the increase of the pressure loss. Further in the honeycomb catalyst body of Comparative Example 4, a gas insufficiently diffused, and hence the purification ratio lowered.

In the honeycomb catalyst body of Comparative Example 5, a pore diameter of a maximum peak value of small pores was excessively large, and a pressure loss was high. Moreover, in the honeycomb catalyst body of Comparative Example 5, a purification ratio was also poor. In Comparative Example 5, pore diameters of the small pores were excessively large, and the discharge of a water by a capillary phenomenon was not suitably performed. Therefore, filling properties of large pores with the SCR catalyst deteriorated, and a catalyst loading state was the same as in the honeycomb catalyst body of Comparative Example 4.

In the honeycomb catalyst body of Comparative Example 6, a pore diameter of a maximum peak value of large pores was excessively small, and hence a pressure loss was high. Moreover, in the honeycomb catalyst body of Comparative Example 6, a purification ratio was also poor. In Comparative Example 6, at catalyst loading, a catalyst slurry was not suitably introduced into the large pores. Therefore, filling properties of the large pores with the SCR catalyst deteriorated, and a thickness of a catalyst layer on the surface of each of partition walls was excessively large. In consequence, hydraulic diameters of cells of the honeycomb catalyst body were excessively small, which resulted in the increase of the pressure loss. Furthermore, in the honeycomb catalyst body of Comparative Example 6, a gas insufficiently diffused, and hence the purification ratio lowered.

In the honeycomb catalyst body of Comparative Example 7, a pore diameter of a maximum peak value of large pores was excessively large, and hence a purification ratio was poor. In Comparative Example 7, pore diameters of large pores were excessively large, a contact area between a gas and the catalyst decreased, and the purification ratio deteriorated.

A honeycomb structure of the present invention can be utilized as a catalyst carrier on which a catalyst to purify an exhaust gas is loaded. A honeycomb catalyst body of the present invention can be used to purify the exhaust gas.

DESCRIPTION OF REFERENCE MARKS

1: partition wall, 2: cell, 3: outer peripheral wall, 11: one end surface, 12: the other end surface, 14: pore, 15: large pore, 16: small pore, 21: catalyst slurry, 22: water (the water of the catalyst slurry), 23: solid component (the solid component of the catalyst slurry), 60: SCR catalyst, 100: honeycomb structure, and 200: honeycomb catalyst body.

What is claimed is:

1. A honeycomb structure comprising:
porous partition walls that divide and form a plurality of cells extending from one end surface of the honeycomb structure to the other end surface thereof and define through channels of a fluid, wherein each of the cells are open at the respective end surfaces of the honeycomb structure;
wherein the partition walls are provided with small pores showing a distribution and having pore diameters smaller than 14 μm in a graph showing a pore diameter distribution of the partition walls, and large pores showing another distribution and having pore diameters of 14 μm or larger in a graph showing the pore diameter distribution of the partition walls;
wherein a porosity of the partition walls is from 50 to 70%, and a porosity of the large pores of the partition walls is 30% or larger;
wherein a ratio of a total volume of the small pores formed in the partition walls to a total volume of the large pores formed in the partition walls is 20% or larger;
wherein the pore diameter at a maximum peak value of pore volumes in the distribution of the large pores is from 20 to 200 μm in the graph showing the pore diameter distribution of the partition walls, and wherein the pore diameter at a maximum peak value of pore volumes in the distribution of the small pores is from 0.1 to 8 μm in the graph showing the pore diameter distribution of the partition walls; and
wherein a value obtained by dividing a porosity value (%) of the large pores by a thickness value (μm) of the partition walls is 0.2 or larger.

2. The honeycomb structure according to claim 1, wherein the thicknesses of the partition walls are from 50.8 to 254 μm.

3. The honeycomb structure according to claim 2, wherein a cell density of the honeycomb structure is 15.5 to 108.5 cells/cm².

4. The honeycomb structure according to claim 3, wherein a material of the partition walls contains at least one type selected from the group consisting of cordierite, aluminum titanate, silicon carbide, and mullite.

5. The honeycomb structure according to claim 2, wherein a material of the partition walls contains at least one type selected from the group consisting of cordierite, aluminum titanate, silicon carbide, and mullite.

6. The honeycomb structure according to claim 1, wherein a cell density of the honeycomb structure is 15.5 to 108.5 cells/cm².

7. The honeycomb structure according to claim 6, wherein a material of the partition walls contains at least one type selected from the group consisting of cordierite, aluminum titanate, silicon carbide, and mullite.

8. The honeycomb structure according to claim 1, wherein a material of the partition walls contains at least one type selected from the group consisting of cordierite, aluminum titanate, silicon carbide, and mullite.

9. The honeycomb structure according to claim 1, wherein the value obtained by dividing the porosity value (%) of the large pores by the thickness value (μm) of the partition walls is 0.25-0.7.

10. The honeycomb structure according to claim 1, wherein the value obtained by dividing the porosity value (%) of the large pores by the thickness value (μm) of the partition walls is 0.21-0.29.

11. A honeycomb catalyst body comprising:
the honeycomb structure according to claim 1; and
an SCR catalyst which selectively reduces components to be purified.

12. The honeycomb catalyst body according to claim 11, wherein the SCR catalyst is a catalyst which selectively reduces nitrogen oxides.

13. A honeycomb catalyst body comprising:
the honeycomb structure according to claim 2; and
an SCR catalyst which selectively reduces components to be purified.

14. A honeycomb catalyst body comprising:
the honeycomb structure according to claim 6; and
an SCR catalyst which selectively reduces components to be purified.

15. A honeycomb catalyst body comprising:
the honeycomb structure according to claim 3; and
an SCR catalyst which selectively reduces components to be purified.

16. A honeycomb catalyst body comprising:
the honeycomb structure according to claim 8; and
an SCR catalyst which selectively reduces components to be purified.

17. A honeycomb catalyst body comprising:
the honeycomb structure according to claim 5; and
an SCR catalyst which selectively reduces components to be purified.

18. A honeycomb catalyst body comprising:
the honeycomb structure according to claim 7; and
an SCR catalyst which selectively reduces components to be purified.

19. A honeycomb catalyst body comprising:
the honeycomb structure according to claim 4; and
an SCR catalyst which selectively reduces components to be purified.

20. The honeycomb catalyst body according to claim 19, wherein the SCR catalyst is a catalyst which selectively reduces nitrogen oxides.

* * * * *